United States Patent
Kim et al.

(10) Patent No.: US 12,050,782 B2
(45) Date of Patent: Jul. 30, 2024

(54) STORAGE DEVICE AND METHOD OF OPERATING THE SAME

(71) Applicant: Samsung Electronics Co., Ltd., Suwon-si (KR)

(72) Inventors: Seungil Kim, Suwon-si (KR); Wonho Kang, Seoul (KR); Gyeongtae Yu, Seongnam-si (KR); Jeongwoo Park, Hwaseong-si (KR); Byungjune Song, Suwon-si (KR); Kyoungback Lee, Hwaseong-si (KR); Jeongsu Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 18/060,165

(22) Filed: Nov. 30, 2022

(65) Prior Publication Data

US 2023/0214132 A1    Jul. 6, 2023

(30) Foreign Application Priority Data

Jan. 6, 2022    (KR) .................. 10-2022-0002368

(51) Int. Cl.
*G06F 12/00*    (2006.01)
*G06F 3/06*    (2006.01)

(52) U.S. Cl.
CPC .......... *G06F 3/0619* (2013.01); *G06F 3/0647* (2013.01); *G06F 3/0679* (2013.01)

(58) Field of Classification Search
CPC .... G06F 3/0619; G06F 3/0647; G06F 3/0679; G11C 29/52
See application file for complete search history.

(56) References Cited

U.S. PATENT DOCUMENTS 8,429,334 B2    4/2013    Ou
8,788,741 B2    7/2014    Kwon et al.
(Continued)

FOREIGN PATENT DOCUMENTS

CN    111324281 A    6/2020

OTHER PUBLICATIONS

US 10,163,498 B1, 12/2018, Jean et al. (withdrawn)
Extender European Search Report corresponding to EP 22204621.1; Dated Jun. 2, 2023 (7 pages).

*Primary Examiner* — John A Lane
(74) *Attorney, Agent, or Firm* — Myers Bigel, P.A.

(57) ABSTRACT

A storage device includes a non-volatile memory device including a first memory region and a second memory region, memory cells of the first memory region being at different levels from memory cells of the second memory region and a controller configured to control a base data protection operation against a rework for a reflow process by including a first operation of migrating base data stored in the first memory region to the second memory region before the rework for a first reflow process and a second operation of restoring the base data from the second memory region to the first memory region after completing the rework for the reflow process. The controller is configured to provide, to a host, management information including at least one of first information on a current state in a base data protection operation against the rework, second information on the first memory region, and third information on the second memory region.

19 Claims, 22 Drawing Sheets

(56) References Cited

U.S. PATENT DOCUMENTS

| | | | |
|---|---|---|---|
| 9,529,541 B2 | 12/2016 | Cho et al. | |
| 10,459,837 B2 | 10/2019 | Chiu | |
| 10,476,002 B2 | 11/2019 | Lin et al. | |
| 2015/0120988 A1 | 4/2015 | Hung et al. | |
| 2018/0322041 A1* | 11/2018 | Chiu | G06F 9/3004 |
| 2019/0066775 A1* | 2/2019 | Jean | G11C 16/3459 |
| 2020/0004446 A1* | 1/2020 | Palmer | G11C 16/20 |
| 2020/0272363 A1 | 8/2020 | Sato | |
| 2021/0240381 A1 | 8/2021 | Sato | |
| 2021/0240607 A1 | 8/2021 | Sato | |
| 2022/0229574 A1* | 7/2022 | Tanpairoj | G06F 3/0679 |
| 2024/0020002 A1* | 1/2024 | Eliash | G06F 3/0647 |

\* cited by examiner

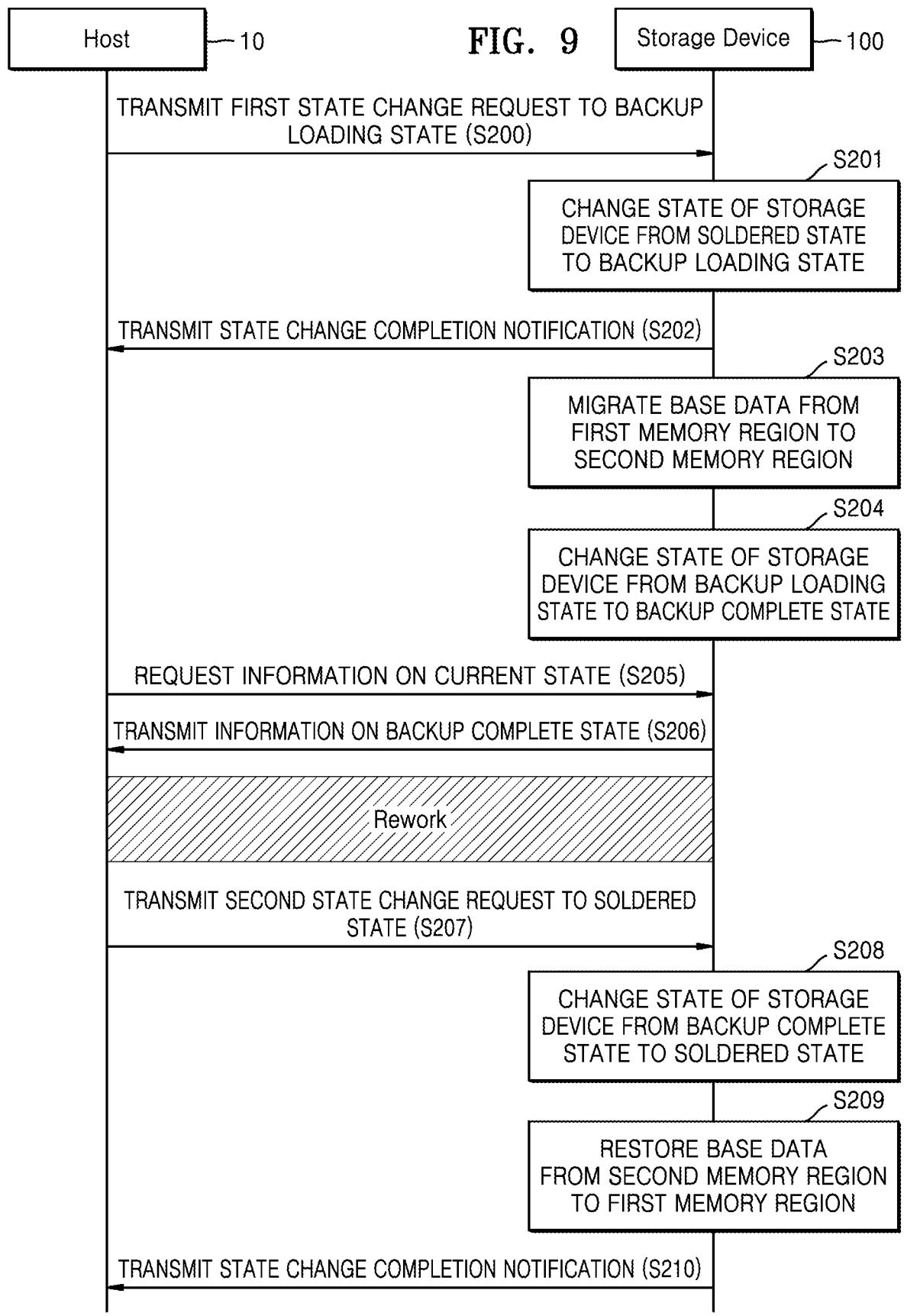

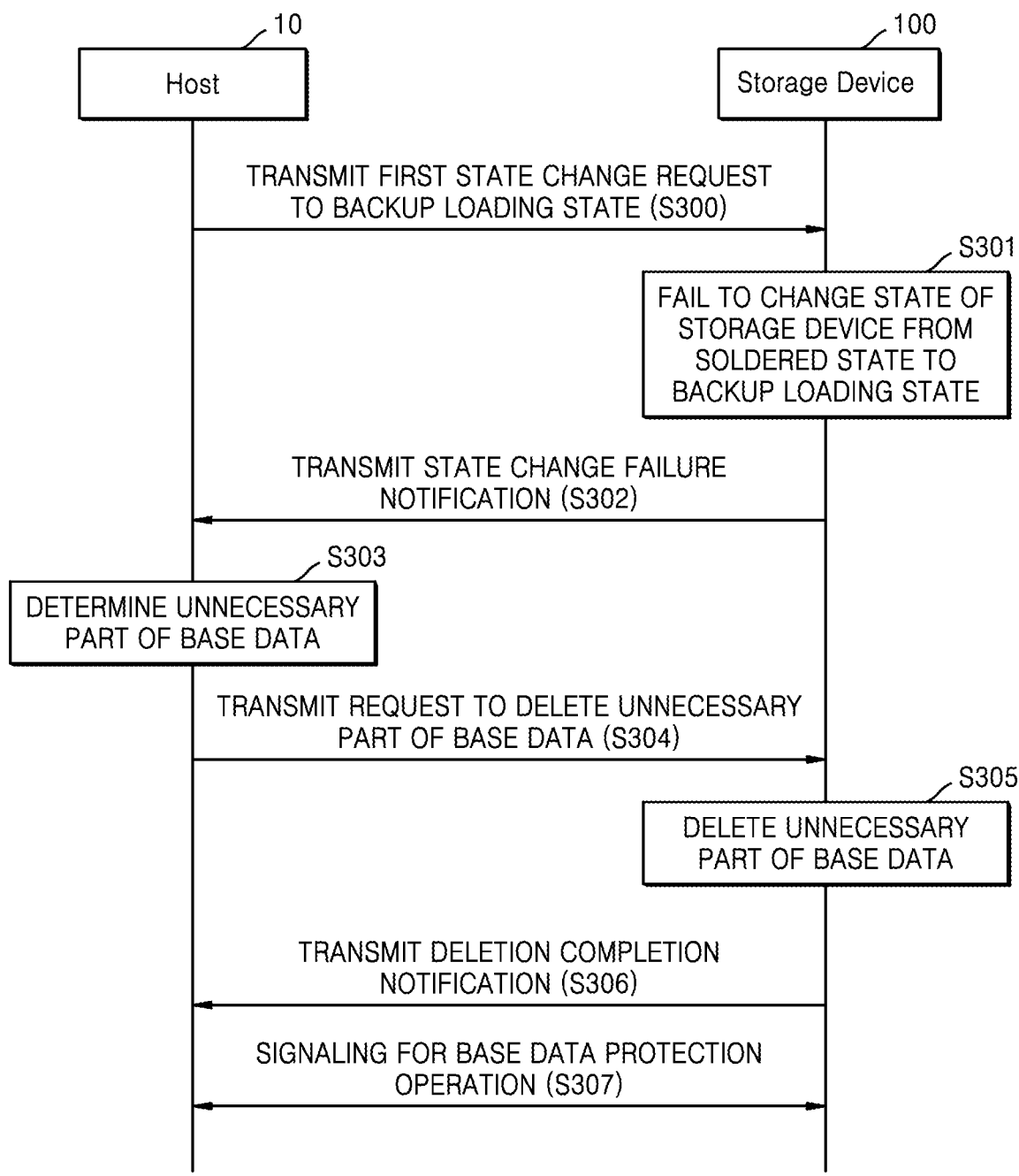

FIG. 11B
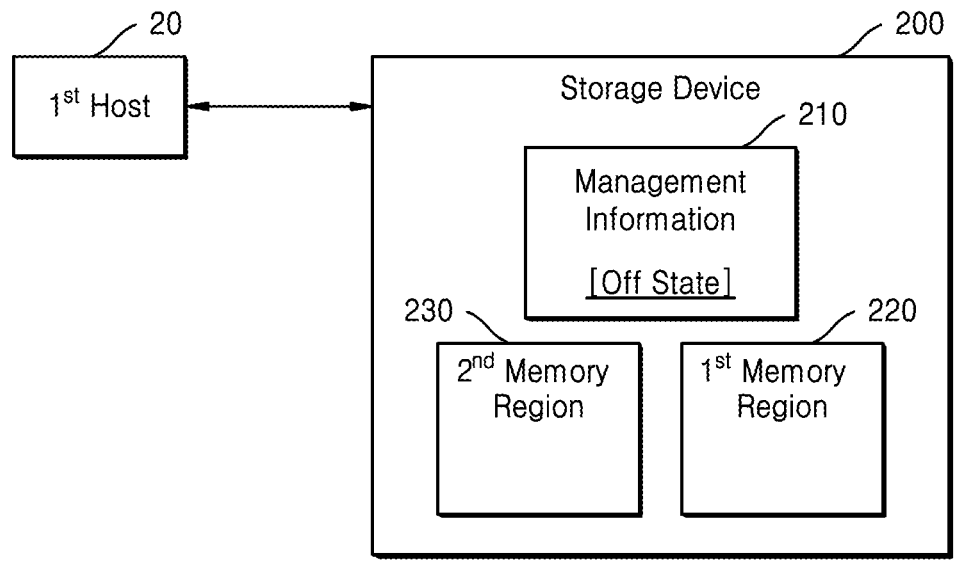
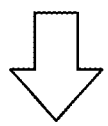
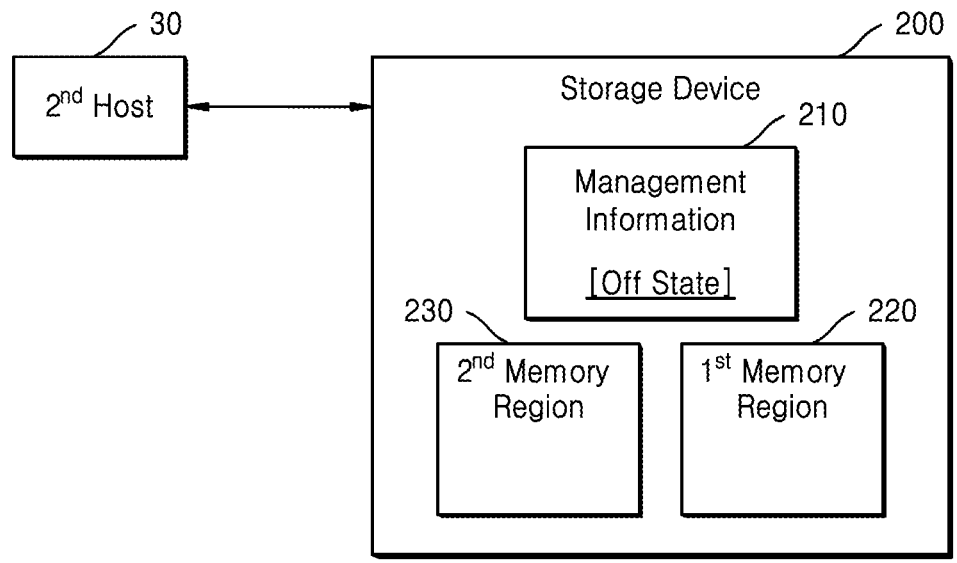

STORAGE DEVICE AND METHOD OF OPERATING THE SAME

CROSS-REFERENCE TO RELATED APPLICATION

This application is based on and claims priority under 35 U.S.C. § 119 to Korean Patent Application No. 10-2022-0002368, filed on Jan. 6, 2022, in the Korean Intellectual Property Office, the disclosure of which is incorporated by reference herein in its entirety.

BACKGROUND

Embodiments of the inventive concept relate to a storage device, and more particularly, to a storage device including a non-volatile memory device that may be capable of increasing data reliability and a method of operating the same.

A semiconductor memory device may be classified as a volatile semiconductor memory device and a non-volatile semiconductor memory device. A volatile semiconductor memory device may read and write data at a high speed. However, when power supply thereto is blocked, stored data is lost. Conversely, a non-volatile semiconductor memory device may be used for storing content to be preserved regardless of whether power is supplied thereto.

A representative example of a non-volatile semiconductor memory device is a flash memory device. Recently, NAND flash-based storage devices have become more commonly used as a storage medium of a mobile device. Frequently, the storage device is mounted on a printed circuit board (PCB) of the mobile device. For this purpose, a reflow process for the storage device may be performed. In the reflow process, a plurality of solder balls are formed on a surface of the storage device, which contacts the PCB. Due to heat generated by the reflow process, base data stored in the storage device may be lost.

To prevent or reduce the risk of losing the base data due to the reflow process, the storage device may perform a base data protection operation under control by a host, which is limited to a first reflow process. Therefore, the base data may be at risk of being lost due to heat generated when a rework of the reflow process is performed.

SUMMARY

Embodiments of the inventive concept relate to a storage device configured to perform an operation for protecting base data stored therein against a rework performed on the storage device after a first reflow process and a method of operating the same.

According to an aspect of the inventive concept, there is provided a storage device including a non-volatile memory device including a first memory region and a second memory region, memory cells of the first memory region being at different levels from memory cells of the second memory region and a controller configured to control a base data protection operation against a rework for a reflow process by including a first operation of migrating base data stored in the first memory region to the second memory region before the rework for a first reflow process and a second operation of restoring the base data from the second memory region to the first memory region after completing the rework for the reflow process. The controller is configured to provide, to a host, management information including at least one of first information on a current state in a base data protection operation against the rework, second information on the first memory region, and third information on the second memory region.

According to another aspect of the inventive concept, there is provided a method of operating a storage device for protecting base data received from a host when a rework of a reflow process is performed. The method includes setting the storage device in a soldered state representing that the base data is stored in a first memory region after completing the reflow process for the storage device, changing a state of the storage device from the soldered state to a backup loading state for a first operation of migrating the base data from the first memory region to a second memory region with higher reliability in response to a first state change request received from the host, changing a state of the storage device from the backup loading state to a backup complete state when the first operation is completed, and changing a state of the storage device from the backup complete state to the soldered state for a second operation of restoring the base data from the second memory region to the first memory region in response to a second state change request received from the host.

According to another aspect of the inventive concept, there is provided a method of operating a storage device for protecting basic data. The method includes transmitting management information to a host in response to a management information request received from the host and performing signaling for a base data protection operation using a first memory region and a second memory region, which includes cells at different levels, respectively, with the host in accordance with a method of controlling the storage device based on the management information. The management information includes first information representing whether a base data protection operation against a reflow process of the storage device is performed.

BRIEF DESCRIPTION OF THE DRAWINGS

Embodiments of the inventive concept will be more clearly understood from the following detailed description taken in conjunction with the accompanying drawings in which:

FIG. 9 is a flowchart illustrating signaling for a base data protection operation against a rework for a reflow process between a host and a storage device according to an embodiment of the inventive concept;

FIGS. 10A and 10B are flowcharts illustrating signaling for a base data protection operation against a rework for a reflow process between a host and a storage device according to an embodiment of the inventive concept;

FIGS. 11A and 11B are views illustrating an operation of a storage device according to an embodiment of the inventive concept;

DETAILED DESCRIPTION OF THE EMBODIMENTS

Figure 1:
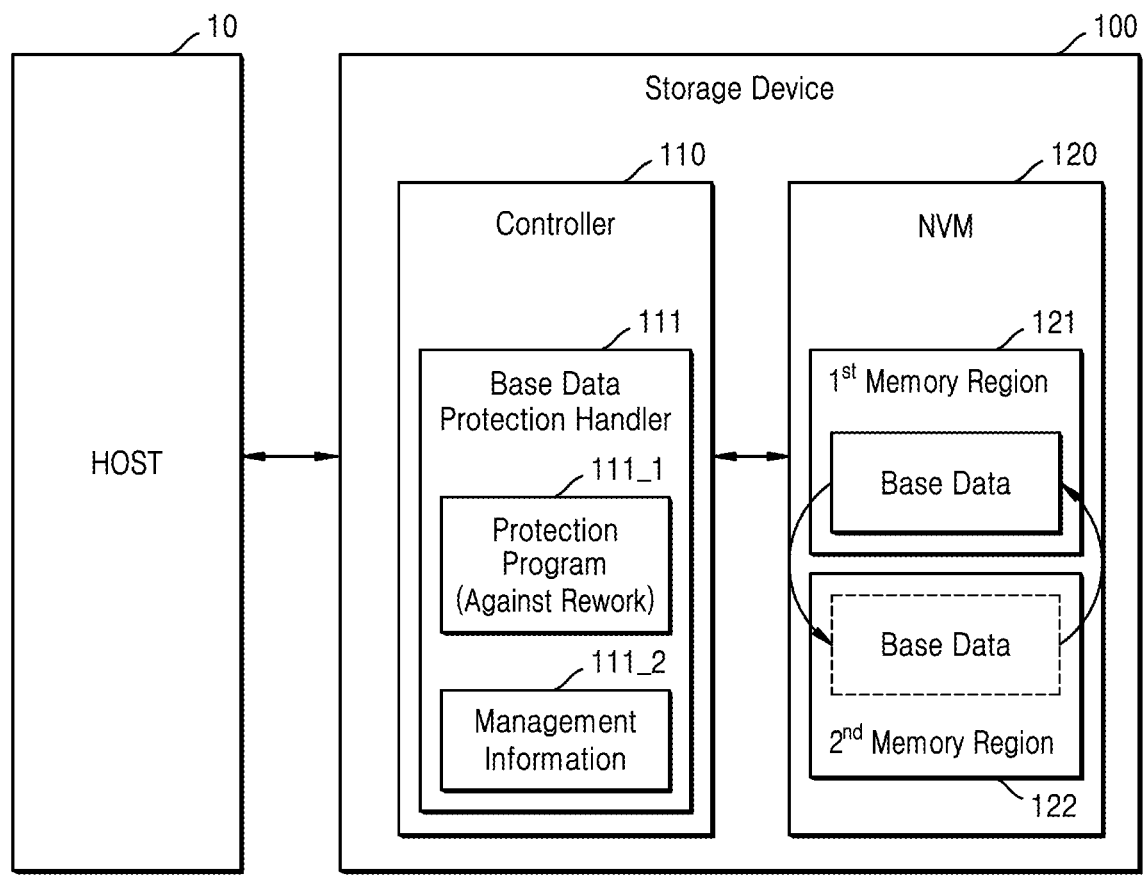
FIG. 1 is a block diagram schematically illustrating a memory system according to an embodiment of the inventive concept.

Various example embodiments will be described more fully hereinafter with reference to the accompanying drawings, in which some example embodiments are shown. The present inventive subject matter may, however, be embodied in many different forms and should not be construed as limited to the embodiments set forth herein. In the drawings, like numerals refer to like elements throughout the description and repeated descriptions may be omitted. It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

FIG. 1 is a block diagram schematically illustrating a memory system 1 according to an embodiment of the inventive concept. The memory system 1 of FIG. 1 is configured in a process of mounting a storage device 100 in an electronic device (not shown) and connection between a host 10 and the storage device 100 may be blocked when the storage device 100 is completely mounted in the electronic device (not shown). In the current specification, a host may be equipment that is used for testing a storage device when the storage device is manufactured and/or equipment that is used for writing an operating system image to the storage device. In addition, in the current specification, base data that is permanently stored in the storage device may include, but is not limited to, for example, debugging data in accordance with a test result of the storage device or an operating system image for driving an operating system of the storage device.

Referring to FIG. 1, the memory system 1 may include the host 10 and the storage device 100. The host 10 may determine that a first reflow process or the rework of the first reflow process is to be performed in a process of mounting the storage device 100 on a target board of an electronic device (not shown) and may request the storage device 100 to perform a base data protection operation against the first reflow process or the rework of the first reflow process. It will be understood, however, that embodiments of the inventive concept are not limited to the first reflow process for the storage device 100 or the rework of the first reflow process and may also be applied to an arbitrary process or work by which heat is generated, such that at least a portion of the base data stored in the storage device 100 may be lost. However, in the current specification, for convenience of illustrating embodiments of the inventive concept, description will be given based on the base data protection operation against the first reflow process or the rework of the first reflow process.

The storage device 100 may include a controller 110 and a non-volatile memory device 120. The controller 110 may be configured to control an overall operation of the non-volatile memory device 120 and may include a base data protection handler 111. In an embodiment, the base data protection handler 111 may be configured to control the base data protection operation against the rework of the first reflow process based on a protection program 111_1 against the rework of the first reflow process and management information 111_2. An operation of the base data protection handler 111 may be interpreted as an operation of the controller 110 or the storage device 100. In some embodiments, the protection program 111_1 and the management information 1112 may be stored in a register included in the controller 110 or may be stored in any memory region in the non-volatile memory device 120. In the current specification, the rework may mean a reflow process performed again on the storage device 100 after the first reflow process or a reflow process performed again on a semiconductor device arranged on the target board to be adjacent to the storage device 100. That is, the rework may mean a process or work that may affect the base data of the storage device 100 by generating heat after the first reflow process.

In an embodiment, the non-volatile memory device 120 may include a first memory region 121 and a second memory region 122. The first and second memory regions 121, 122 may include memory cells at different levels, respectively. For example, the cells included in the first memory region 121 may be at a higher level than that of the cells included in the second memory region 122. Therefore, the second memory region 122 may provide higher reliability than the first memory region 121. For example, the first memory region 121 may include multilevel cells each of which may store two or more bits of data and the second memory region 122 may include single-level cells each of which may store one bit of data. An example embodiment of the first memory region 121 and the second memory region 122 will be described later with reference to FIGS. 2A and 2B. In some embodiments, the non-volatile memory device 120 may include three or more memory regions including cells at different levels, respectively, and may be configured to perform the base data protection operation according to an embodiment of the inventive concept by using three or more memory regions.

In FIG. 1, it is premised that the base data is stored in the second memory region 122 after the first reflow process for the storage device 100 is completed. In an embodiment, the base data may be stored in the first memory region 121 or the second memory region 122 before the first reflow process and may be stored in the second memory region 122 after the first reflow process is completed. A detailed embodiment thereof will be described later with reference to FIGS. 4A and 4B.

In an embodiment, the base data protection handler 111 may be configured to execute the protection program 111_1 to control the base data protection operation against the rework in accordance with a request from the host 10. Specifically, the base data protection handler 111 may be configured to control the base data protection operation against the rework based on signaling with the host 10. The base data protection handler 111 may be configured to migrate the base data stored in the first memory region 121 to the second memory region 122 before performing the rework for the storage device 100 and may restore the base data from the second memory region 122 to the first memory region 121 after completing the rework. That is, the base data protection handler 111 may migrate the base data to the second memory region 122, which may be more resistant to heat based on higher reliability, before the rework and may restore the base data to the first memory region 121 when the rework is completed.

In an embodiment, the base data protection handler 111 may be configured to generate and update the management information 111_2 used for performing the base data protection operation against the rework. For example, the management information 111_2 may include one or more of first information on a current state of the storage device 100 in the base data protection operation against the rework, second information on the first memory region 121, and third information on the second memory region 122. Detailed description of the first information will be given later with reference to FIGS. 3A to 3C.

In an embodiment, the host 10 may be configured to transmit a request for the base data protection operation suitable for the first information to the storage device 100 with reference to the first information of the management information 111_2 received from the storage device 100. For example, when the first information of the management information 1112 represents that the base data is stored in the first memory region 121 after the storage device 100 undergoes the first reflow process, the host 10 may determine that the storage device 100 undergoes the first reflow process and that it is not necessary to transmit the base data and may request the storage device 100 to perform the base data protection operation against the rework without transmitting the base data. As another example, when the first information of the management information 111_2 represents that the base data protection operation of the storage device 100 against the first reflow process is deactivated, the host 10 may determine that the storage device 100 has not undergone the first reflow process yet, may transmit the base data to the storage device 100 together with a write request only when the base data is not stored in the storage device 100, and may request the storage device 100 to perform the base data protection operation against the first reflow process.

In some embodiments, the host connected to the storage device 100 in a process of performing the first reflow process may be different from the host connected to the storage device 100 in a process of performing the rework. Therefore, the host newly connected to the storage device 100 may be configured to immediately determine a history of the storage device 100 through the management information 111_2 and may request the base data protection operation suitable for the history of the storage device 100. In addition, the host may be configured to continuously monitor the storage device 100 on which the rework is repeatedly performed to test loss of the base data stored in the storage device 100 or to focus on management of the rework performed on the storage device 100 so that the rework may be successfully performed.

In an embodiment, the host 10 may be configured to transmit a request for the base data protection operation suitable for the second information and the third information to the storage device 100 with reference to the second information and the third information of the management information 111_2. For example, the second information may represent a size of the base data stored in the first memory region 121 and the third information may represent a free size of the second memory region 122. When it is determined that the size of the base data is greater than the free size of the second memory region 122 through the second information and the third information, the host 10 may be configured to request the storage device 100 to perform the base data protection operation after requesting the storage device 100 to delete unnecessary pieces of the base data. In some embodiments, when it is determined that the size of the base data is greater than the free size of the second memory region 122 through the second information and the third information, the host 10 may be configured to request the storage device 100 to perform the base data protection operation after requesting the storage device 100 to compress the base data. In an embodiment, the unnecessary pieces of the base data may be determined by the host 10 or the base data protection handler 111.

The storage device 100, according to the embodiment of the inventive concept, may be configured to continuously reduce the likelihood of or prevent the base data from being lost until the storage device 100 is mounted in the electronic device by supporting the base data protection operation against the rework of the first reflow process.

In addition, the storage device 100 according to the embodiment of the inventive concept may be configured to provide the management information 111_2 used in the base data protection operation against the rework to the host 10 so that the host 10 may easily determine the history of the storage device 100 and may be configured to transmit, to the storage device 100, the request for the base data protection operation suitable for the history of the storage device 100.

Figure 2A:
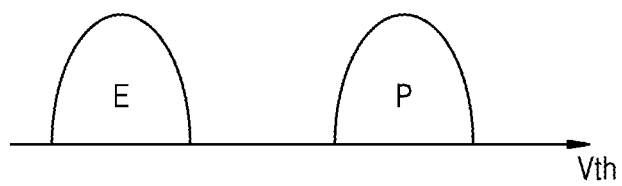
FIG. 2A is a view illustrating a threshold voltage distribution of cells included in a second memory region of FIG. 1 according to an embodiment of the inventive concept.
Figure 2B:
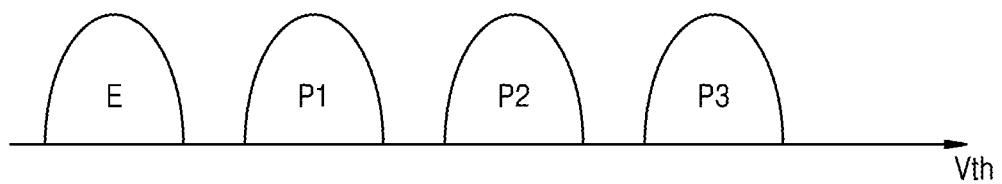
FIG. 2B is a view illustrating a threshold voltage distribution of cells included in a first memory region of FIG. 1 according to an embodiment of the inventive concept.

FIG. 2A is a view illustrating a threshold voltage distribution of cells included in the second memory region 122 of FIG. 1 according to some embodiments of the inventive concept, and FIG. 2B is a view illustrating a threshold voltage distribution of cells included in the first memory region 121 of FIG. 1 according to some embodiments of the inventive concept.

Referring to FIG. 2A, each of the cells included in the second memory region 122 as single-level cells may store one bit of data. A single-level cell may correspond to one of an erase state E and a program state P.

Referring to FIG. 2B, each of the cells included in the first memory region 121 as multilevel cells may store two-bit data. A multilevel cell may correspond to one of an erase state E and first to third program states P1, P2, and P3.

Because a distance between threshold voltage distributions E and P of the single-level cell is greater than a distance between each two of threshold voltage distributions E, P1, P2, and P3 of the multilevel cell, a read margin is greater in the single-level cell than in the multilevel cell so that the single-level cell may provide higher data reliability than the multilevel cell.

Therefore, according to an embodiment of the inventive concept, to reduce the likelihood or prevent the base data from being lost due to heat generated by the rework, the base data may migrate from the first memory region 121 (refer to FIG. 1) to the second memory region 122 (refer to FIG. 1) before the rework.

It will be understood, however, that FIGS. 2A and 2B are only an example embodiment, the inventive concept is not limited thereto and the cells included in the first memory region 121 may be triple-level cells or quad-level cells and the cells included in the second memory region 122 may be at a lower level than the cells included in the first memory region 121.

Figure 3A:
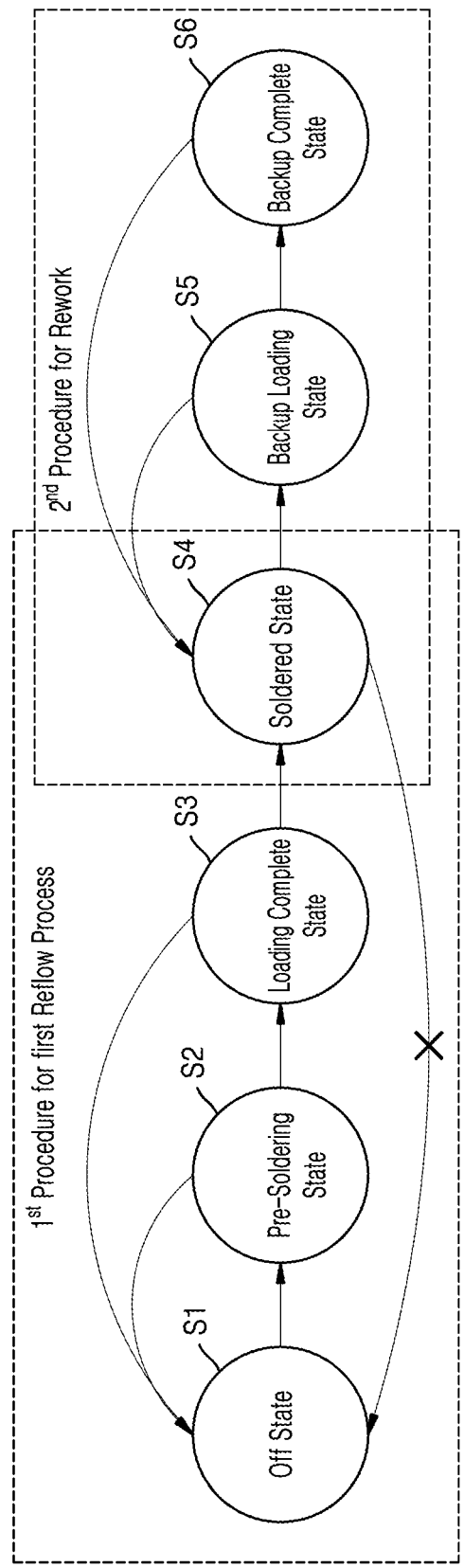
FIG. 3A is a view illustrating a state of a storage device according to an embodiment of the inventive concept.
Figure 3B:
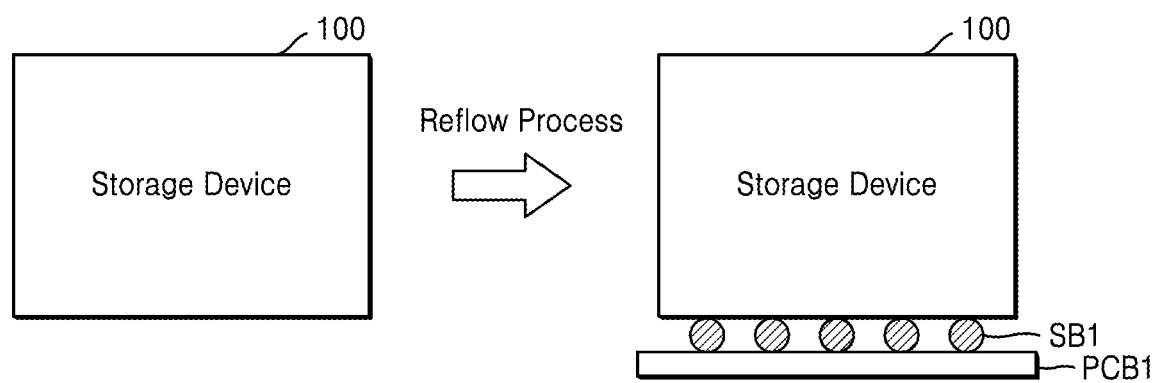
FIGS. 3B and 3C are views illustrating a storage device on which a reflow process and a rework of a reflow process are respectively performed according to an embodiment of the inventive concept.
Figure 3C:
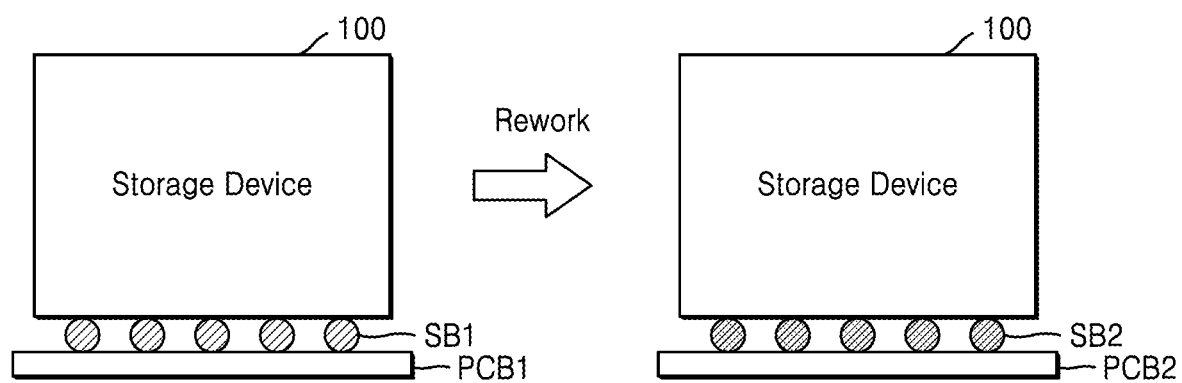

FIG. 3A is a view illustrating a state of the storage device 100 according to an embodiment of the inventive concept, and FIGS. 3B and 3C are views illustrating the storage device 100 on which a reflow process and a rework of a reflow process are respectively performed according to some embodiments of the inventive concept. Hereinafter, for convenience sake, description will be given with reference to FIGS. 1 and 3A to 3C.

Referring to FIG. 3A, the storage device 100 may be in one of an off state S1, a pre-soldering state S2, a loading complete state S3, and a soldered state S4 in a first procedure of the first reflow process. In the current specification, the first procedure means the base data protection operation of the storage device 100 against the first reflow process and the states S1 to S4 may be defined to inform the host 10 of a progress of the base data protection operation.

In an embodiment, the base data protection operation against the first reflow process may include a first operation of migrating the data stored in the first memory region 121 to the second memory region 122 before the first reflow process and a second operation of restoring the base data from the second memory region 122 to the first memory region 121 after the first reflow process is completed. The states S1 to S4 of the first procedure may represent progress of the above operations as follows. For example, the off state S1 may represent that the base data protection operation against the first reflow process is deactivated, the pre-soldering state S2 may represent that the first operation is being performed, the loading complete state S3 may represent that the first operation is completed, and the soldered state S4 may represent that the base data is stored in the first memory region 121 by the second operation. However, embodiments of the inventive concept are not limited thereto, and states of the first procedure may be defined by one of various methods of representing a progress of the base data protection operation against the reflow process.

In an embodiment, the storage device 100 may be in one of a soldered state S4, a backup loading state S5, and a backup complete state S6 in a second procedure for the rework. In the current specification, the second procedure means the base data protection operation of the storage device 100 against the rework and the states S4 to S6 may be defined to inform the host 10 of a progress of the base data protection operation.

In an embodiment, the base data protection operation against the rework may include a third operation of migrating the data stored in the first memory region 121 to the second memory region 122 before the rework and a fourth operation of restoring the base data from the second memory region 122 to the first memory region 121 after the rework is completed. The states S4 to S6 of the second procedure may represent progress of the above operations as follows. For example, the soldered state S4 may represent that the base data is stored in the first memory region 121, the backup loading state S5 may represent that the third operation is being performed, and the backup complete state S6 may represent that the third operation is completed. However, embodiments of the inventive concept are not limited thereto, and states of the second procedure may be defined by one of various methods of representing progress of the base data protection operation against the rework. In addition, names of the states may vary in accordance with a standard specification related to the base data protection operation.

In an embodiment, the base data protection handler 111 may be configured to manage the states S1 to S4 in accordance with the first procedure and the states S4 to S6 in accordance with the second procedure. For example, the base data protection handler 111 may be configured to update a current state of the storage device 100 to the management information 111_2 and may be configured to transmit the management information 111_2 to the host 10 and the host 10 may be configured to determine the current state of the storage device 100 with reference to the management information 111_2 and may be configured to transmit a request suitable for the current state to the storage device 100.

In an embodiment, the base data protection handler 111 may be configured to change the state of the storage device 100 in the order of the off state S1, the pre-soldering state S2, the loading complete state S3, and the soldered state S4 in the first procedure and may be further configured to control an operation suitable for the state of the storage device 100. The base data protection handler 111 may be configured to change the state of the storage device 100 from the pre-soldering state S2 to the off state S1 or from the loading complete state S3 to the off state S1 in response to a request from the host 10 to cancel the first procedure (or a request to cancel the base data protection operation against the reflow process). In addition, because the soldered state S4 represents that the first procedure is performed by the storage device 100 and the host 10 needs to determine whether the first procedure is performed by the storage device 100, the base data protection handler 111 may be configured to prevent the state of the storage device 100 from changing from the soldered state S4 to the off state S1 in the first procedure. That is, the host 10 may be newly connected to the storage device 100 for the rework performed on the storage device 100 and, when it is determined by the management information 111_2 that the storage device 100 is in the soldered state S4, the host 10 may be configured to immediately determine that the storage device 100 is to be reworked so that an unnecessary request to write the base data may be omitted and may be further configured to control the storage device 100 considering that the first reflow process performed on the storage device 100 fails.

In an embodiment, the base data protection handler 111 may be configured to change the state of the storage device 100 in the order of the soldered state S4, the backup loading state S5, and the backup complete state S6 in the second procedure and may be further configured to control an operation suitable for the state of the storage device 100. The base data protection handler 111 may be configured to change the state of the storage device 100 from the backup loading state S5 to the soldered state S4 or from the backup complete state S6 to the soldered state S4 in response to a request from the host 10 to cancel the second procedure (or a request to cancel the base data protection operation against the rework).

The names of the states S1 to S6 in FIG. 3A are defined for convenience sake and purposes of illustration and it will be fully understood that embodiments of the inventive concept are not limited thereto.

Referring to FIG. 3B, first solder balls SB1 may be formed on one surface of the storage device 100 through the reflow process and the storage device 100 may be mounted on a first printed circuit board (PCB) PCB1. The first solder balls SB1 may be formed by one of a first soldering method through an infrared heater, a second soldering method of generating heat in a space outside a chamber and convection of hot air into the chamber, and a third soldering method in a vacuum state. The storage device 100 may be configured to perform the first procedure of FIG. 3A to reduce or minimize loss of the base data due to heat generated when the first solder balls SB1 are formed.

Referring to FIG. 3C, the first solder balls SB1 formed on one surface of the storage device 100 through the reflow process may be exchanged with second solder balls SB2 and the storage device 100 may be mounted on a second PCB PCB2. In some embodiments, the first PCB PCB1 may be the same as or different from the second PCB PCB2. By one of the first to third soldering methods, the first solder balls SB1 may be exchanged with the second solder balls SB2. The storage device 100 may be configured to perform the second procedure of FIG. 3A to reduce or minimize loss of the base data due to heat generated when the first solder balls SB1 are exchanged with the second solder balls SB2.

Figure 4A:
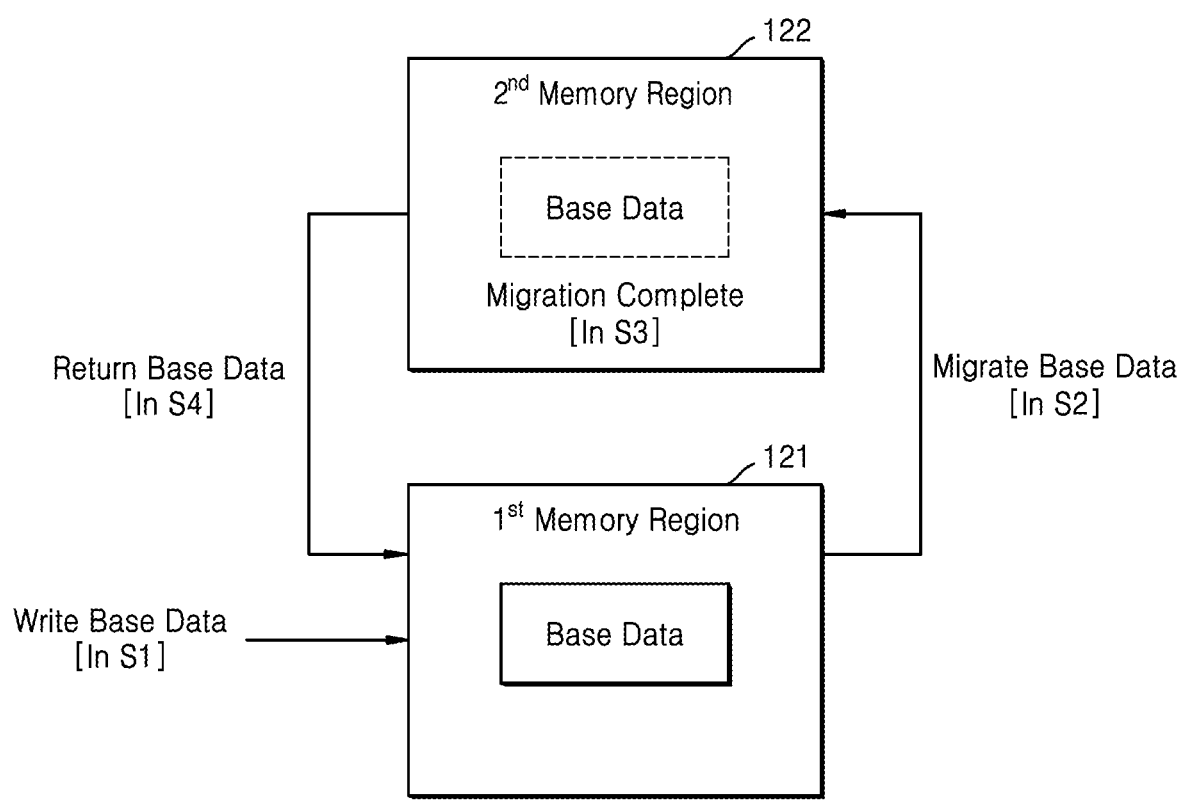
FIGS. 4A and 4B are views illustrating a base data protection operation according to an embodiment of the inventive concept.
Figure 4B:
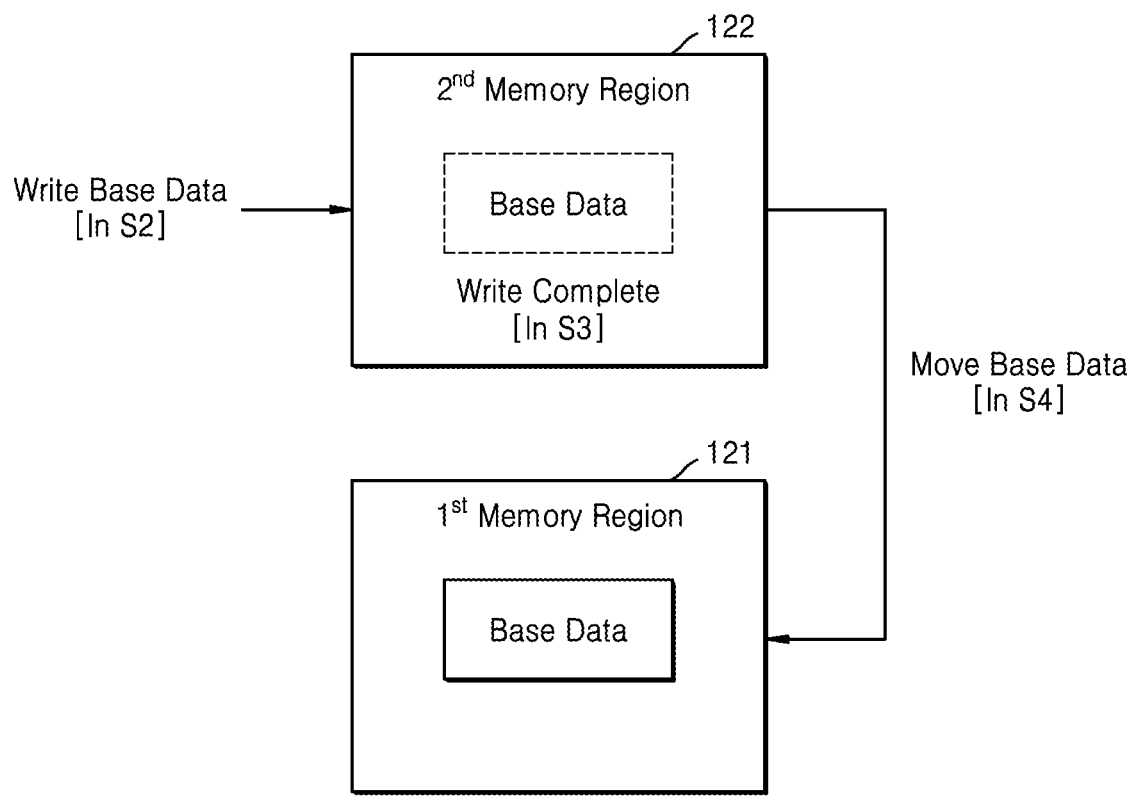

FIGS. 4A and 4B are views illustrating a base data protection operation according to an embodiment of the inventive concept. In FIGS. 4A and 4B, description will be given based on the base data protection operation against the reflow process. Hereinafter, for convenience sake, description will be given with reference to FIGS. 3A, 4A, and 4B.

Referring to FIG. 4A, in the off state S1, the storage device 100 may be configured to receive the request to write the base data and the base data from the host 10 and may be further configured to store the base data in the first memory region 121 in response to the request to write the base data. When the stage of the storage device 100 changes from the off state S1 to the pre-soldering state S2, the storage device 100 may migrate the base data from the first memory region 121 to the second memory region 122. When migration of the base data from the first memory region 121 to the second memory region 122 is completed, the state of the storage device 100 may change from the pre-soldering state S2 to the loading complete state S3. Then, the first reflow process may be performed on the storage device 100, the state of the storage device 100 may change from the loading complete state S3 to the soldered state S4 after the first reflow process is completed, and the storage device 100 may be configured to restore the base data from the second memory region 122 to the first memory region 121.

Referring to FIG. 4B, in the pre-soldering state S2, the storage device 100 may be configured to receive the request to write the base data and the base data from the host 10 and may be further configured to write the base data in the second memory region 122 in response to the request to write the base data. When the base data is completely written in the second memory region 122, the state of the storage device 100 may change from the pre-soldering state S2 to the loading complete state S3. Then, the first reflow process may be performed on the storage device 100, the state of the storage device 100 may change from the loading complete state S3 to the soldered state S4 after the first reflow process is completed, and the storage device 100 may move the base data from the second memory region 122 to the first memory region 121.

As described above, in the embodiment of FIG. 4B, in comparison with FIG. 4A, by immediately writing the base data in the second memory region 122, movement of the base data due to the base data protection operation may be reduced or minimized.

In addition to FIGS. 4A and 4B, the base data may be stored in the storage device 100 in one of various methods before the first reflow process and the storage device 100 may be in the soldered state representing that the base data is stored in the first memory region 121 after undergoing the first reflow process. The host 10 may be configured to transmit a request related to the rework to the storage device 100 after determining that the storage device 100 is in the soldered state.

Figure 5:
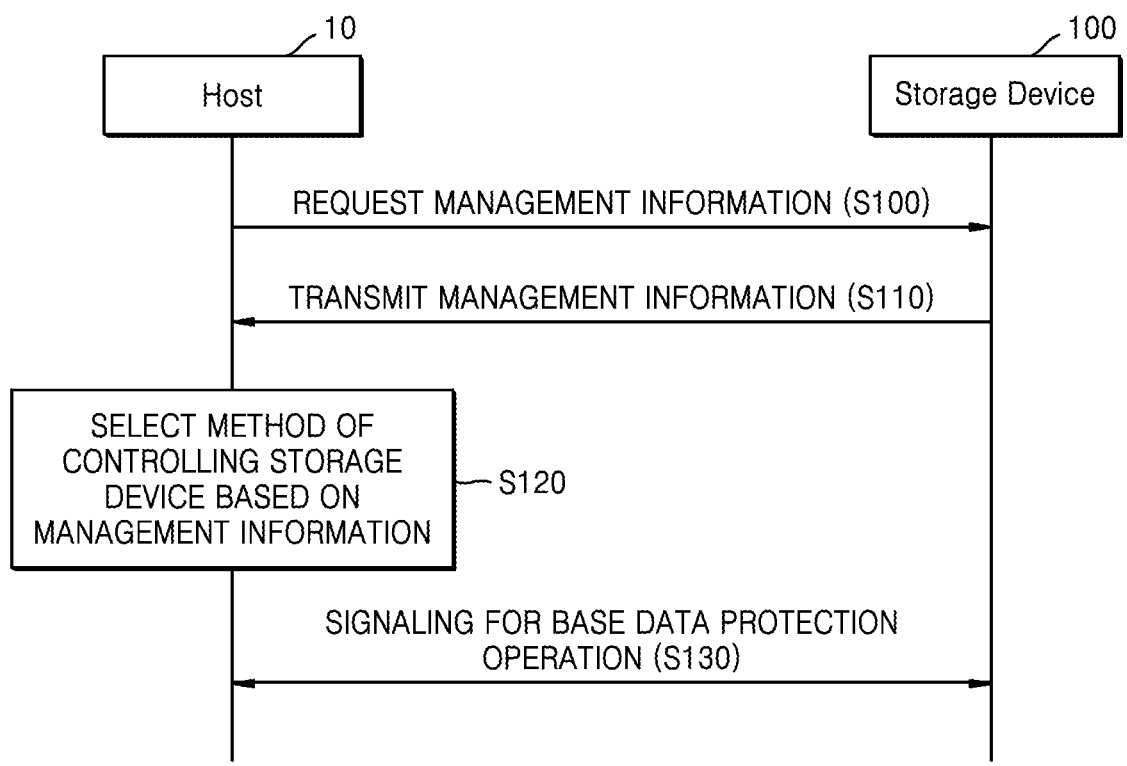
FIG. 5 is a flowchart schematically illustrating signaling for a base data protection operation between a host and a storage device according to an embodiment of the inventive concept.

FIG. 5 is a flowchart schematically illustrating signaling for the base data protection operation between the host 10 and the storage device 100 according to an embodiment of the inventive concept.

Referring to FIG. 5, in operation S100, the host 10 may request the management information to the storage device 100. In an embodiment, the management information may include one or more of the first information on the current state of the storage device 100, the second information on the first memory region of the storage device 100, and/or the third information on the second memory region of the storage device 100. For example, the first information may represent one of the states S1 to S6 of FIG. 3A, the second information may represent the size of the base data stored in the first memory region 121, and the third information may represent the free size of the second memory region 122.

In operation S110, the storage device 100 may transmit the management information to the host 10. In operation S120, the host 10 may select a method of controlling the storage device 100, based on the management information. In an embodiment, the host 10 may determine whether the storage device 100 undergoes the first reflow process from the first information and may select whether to control the base data protection operation against the first reflow process of the storage device 100 or to control the base data protection operation against the rework of the storage device 100 based on the determination result. In addition, the host 10 may determine whether the base data is stored in the storage device 100 and may determine whether to transmit the request to write the base data and the base data to the storage device 100. In an embodiment, the storage device 100 may control the base data protection operation against the rework of the storage device 100, based on the second information and the third information.

In operation S130, the host 10 may perform signaling for the base data protection operation with the storage device 100, based on the method selected in operation S120.

Figure 6:
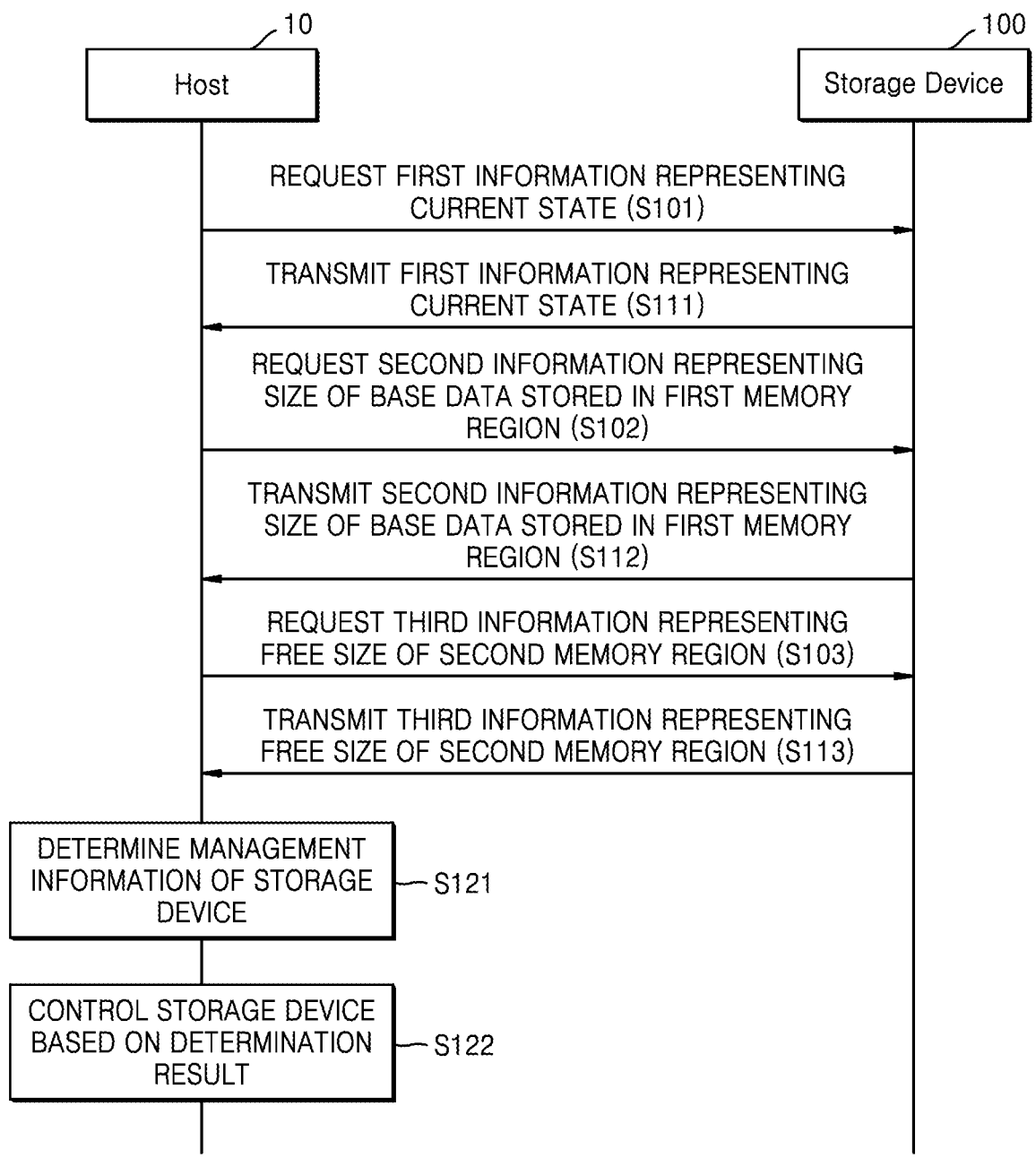
FIG. 6 is a flowchart schematically illustrating signaling for a base data protection operation between a host and a storage device according to an embodiment of the inventive concept.

FIG. 6 is a flowchart schematically illustrating signaling for the base data protection operation between the host 10 and the storage device 100 according to an embodiment of the inventive concept.

Referring to FIG. 6, in operation S101, the host 10 may request the first information on the current state of the storage device 100 from the storage device 100. In an embodiment, when the host 10 requests the first information included in the management information in operation S101, the storage device 100 may be in the off state that is an initial state in the first procedure of FIG. 3A or may be in the soldered state that is an initial state in the second procedure of FIG. 3A. In operation S111, the storage device 100 may transmit the first information on the current state of the storage device 100 to the host 10. In an embodiment, in the operation S111, the storage device 100 may transmit, to the host 10, the first information, which is suitable for the current state thereof between the off state and the soldered state. In operation S102, the host 10 may request the second information on the size of the base data stored in the first memory region from the storage device 100. In operation S112, the storage device 100 may transmit the second information on the size of the base data stored in the first memory region to the host 10. In operation S103, the host 10 may request the third information on the free size of the second memory region from the storage device 100. In operation S113, the storage device 100 may transmit the third information on the free size of the second memory region to the host 10.

In operation S121, the host 10 may determine the management information of the storage device 100. In an embodiment, the host 10 may determine a process related history of the storage device 100, based on the first information. In an embodiment, the host 10 may determine whether the first reflow process is performed on the storage device 100 in accordance with the current state of the storage device 100. For example, when the storage device 100 is in the off state, the host 10 may determine that the storage device 100 has not undergone the first reflow process yet. In some embodiments, the host 10 may determine that it is necessary to determine whether the base data is stored in the storage device 100. In an embodiment, the host 10 may determine states of the first memory region and the second memory region of the storage device 100, based on the second information and the third information. For example, the host 10 may compare the size of the base data stored in the first memory region with the free size of the second memory region.

In operation S122, the host 10 may control the storage device 100 based on the determination result of operation S121. For example, when the storage device 100 is in the off state, the host 10 may control the base data protection operation in case the first reflow process is performed on the storage device 100 and may perform control so that the base data is written in the storage device 100 as occasion demands. As another example, when the storage device 100 is in the soldered state, the host 10 may control the base data protection operation in case the rework is performed on the storage device 100 and may not transmit the request to write the base data in the storage device 100 and the base data. In addition, when the size of the base data stored in the first memory region is not greater than the free size of the second memory region in operation S122, the host 10 may control the storage device 100 to immediately perform the base data protection operation. When the size of the base data stored in the first memory region is greater than the free size of the second memory region in operation S122, the host 10 may control the storage device 100 to perform the base data protection operation after processing the base data.

Figure 7A:
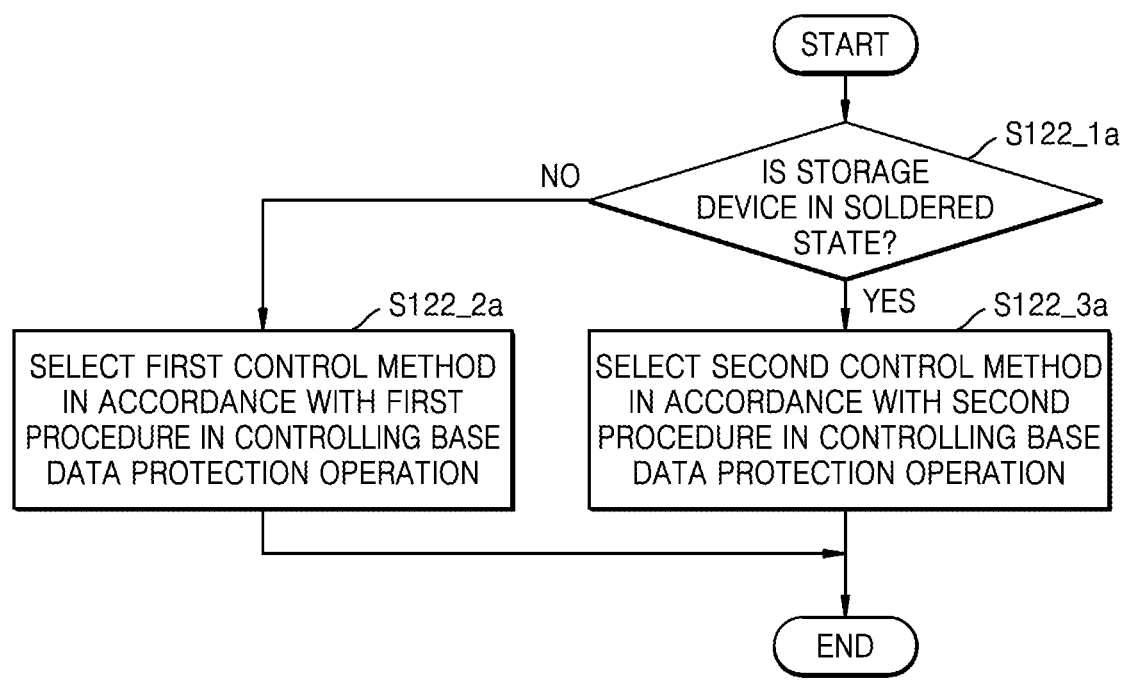
FIGS. 7A and 7B are flowcharts illustrating an operation of FIG. 6 according to an embodiment of the inventive concept.
Figure 7B:
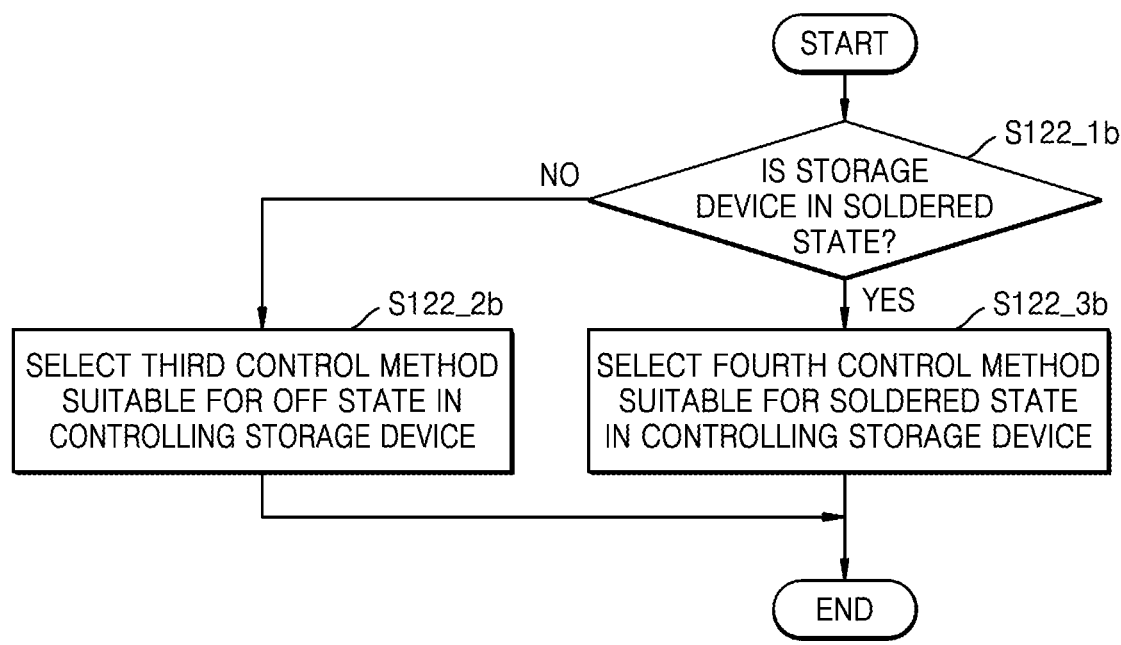

FIGS. 7A and 7B are flowcharts illustrating operation S122 of FIG. 6 according to some embodiments of the inventive concept. Hereinafter, for convenience sake, description will be given with reference to FIGS. 6, 7A, and 7B.

Referring to FIG. 7A, in operation S122_1a, the host 10 may determine whether the storage device 100 is in the soldered state. When it is determined in operation S122_1a that the storage device 100 is not in the soldered state, the host 10 may determine that the storage device 100 is in the off state and operation S122_2a is subsequently performed so that the host 10 may select a first control method in accordance with the first procedure in controlling the base data protection operation. Specifically, the host 10 may transmit requests based on the first control method to the storage device 100 so that the base data protection operation may be performed by the storage device 100 before the first reflow process is performed on the storage device 100 that has not undergone the first reflow process. In an embodiment, operation S122_2a may be based on the first procedure described in FIG. 3A.

When it is determined in operation S122_1a that the storage device 100 is in the soldered state, operation S122_3a is subsequently performed so that the host 10 may select a second control method in accordance with the second procedure in controlling the base data protection operation. Specifically, the host 10 may transmit requests based on the second control method to the storage device 100 so that the base data protection operation may be performed by the storage device 100 before the rework is performed on the storage device 100 that undergoes the first reflow process. In an embodiment, operation S122_3a may be based on the second procedure described with reference to FIG. 3A.

Referring to FIG. 7B, in operation S122_1b, the host 10 may determine whether the storage device 100 is in the soldered state. When it is determined in operation S122_1b that the storage device 100 is not in the soldered state, the host 10 may determine that the storage device 100 is in the off state and operation S122_2b is subsequently performed so that the host 10 may select a third control method suitable for the off state in controlling the storage device 100. In an embodiment, the host 10 may perform a required operation other than the base data protection operation on the storage device 100 that has not undergone the first reflow process based on the third control method. For example, the host 10 may transmit the request to write the base data to the storage device 100 when the base data is not stored in the storage device 100.

When it is determined in operation S122_1b that the storage device 100 is in the soldered state, operation S122_3b is subsequently performed so that the host 10 may select a fourth control method suitable for the soldered state in controlling the storage device 100. In an embodiment, the host 10 determines the number of times of performing the rework on the storage device 100 and may focus on the management of the storage device 100 based on the determination result. In addition, the host 10 may reduce the number of times of performing the rework on the storage device 100 by controlling rework related parameters so that the rework may be successfully performed on the storage device 100.

Figure 8:
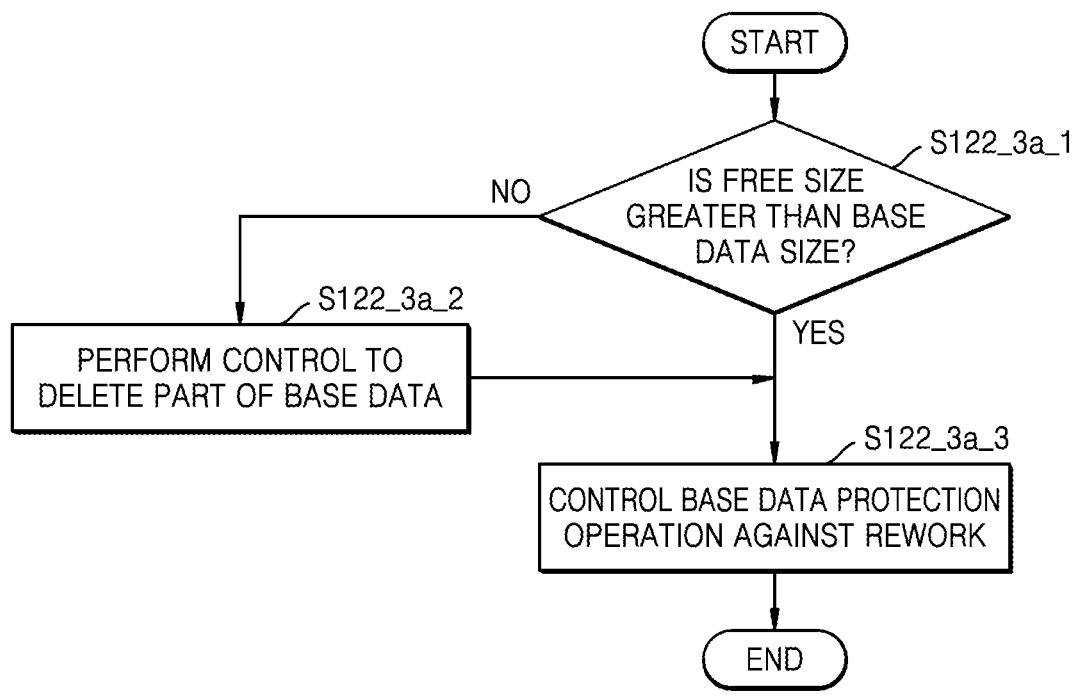
FIG. 8 is a flowchart illustrating a base data protection example of an operation of FIG. 6 according to an embodiment of the inventive concept.

FIG. 8 is a flowchart illustrating the base data protection operation of operation S122 of FIG. 6 according to some embodiments of the inventive concept.

Referring to FIG. 8, in operation S122_3a_1, the host 10 may determine whether the free size of the second memory region 122 is greater than the size of the base data stored in the first memory region 121. When it is determined in operation S122_3a_1 that the free size of the second memory region 122 is not greater than the size of the base data stored in the first memory region 121, the host 10 may control the storage device 100 to delete a part of the base data in operation S122_3a_2. For example, the host 10 may control the storage device 100 to delete an unnecessary part of the base data so that the size of the base data is not greater than the free size of the second memory region. In some embodiments, the host 10 may control the storage device 100 to compress the base data so that the size of the compressed base data is not greater than the free size of the second memory region. When it is determined in operation S122_3a_1 that the free size of the second memory region 122 is greater than the size of the base data stored in the first memory region 121, the host 10 may control the base data protection operation against the rework without modifying the base data. Signaling for the base data protection operation against the rework according to an embodiment of the inventive concept will be specifically described below with reference to FIG. 9.

FIG. 9 is a flowchart illustrating signaling for the base data protection operation against the rework between the host 10 and the storage device 100 according to an embodiment of the inventive concept. Hereinafter, for convenience sake, description will be given with reference to FIGS. 3A and 9.

Referring to FIG. 9, in operation S200, the host 10 may transmit a first state change request from the soldered state S4 to the backup loading state S5 to the storage device 100. In operation S201, the state of the storage device 100 may change from the soldered state S4 to the backup loading state S5. In operation S202, the storage device 100 may transmit a state change completion notification to the host 10 in response to the first state change request. In operation S203, the storage device 100 may migrate the base data from the first memory region to the second memory region. In operation S204, the state of the storage device 100 may change from the backup loading state S5 to the backup complete state S6 after operation S203 is completed. In operation S205, the host 10 may request information on the current state of the storage device 100 from the storage device 100. In operation S206, the storage device 100 may transmit information on the backup complete state to the host 10 in response to the request of operation S205. In other embodiments, when the host 10 requests the information on the current state of the storage device 100 from the storage device 100 during operation S203, the storage device 100 may transmit information on the backup loading state to the host 10. After operation S206, the host 10 may perform the rework on the storage device 100. In an embodiment, the rework may include one or more of an operation of exchanging solder balls of the storage device 100 with new solder balls, an operation of exchanging solder balls of the semiconductor device arranged on the target board to be adjacent to the storage device 100 with new solder balls, and/or an operation of attaching or detaching the storage device 100 to or from the target board. The rework may be performed when the base data of the storage device 100 is stored in the second memory region with higher reliability than the first memory region.

After the rework is completed, in operation S207, the host 10 may transmit a second state change request from the backup complete state S6 to the soldered state S4 to the storage device 100. In operation S208, the state of the storage device 100 may change from the backup complete state S6 to the soldered state S4 in response to the second state change request. In operation S209, the storage device 100 may restore the base data from the second memory region to the first memory region. In operation S210, the storage device 100 may transmit a state change completion notification to the host 10 in response to the second state change request.

Figure 10B:
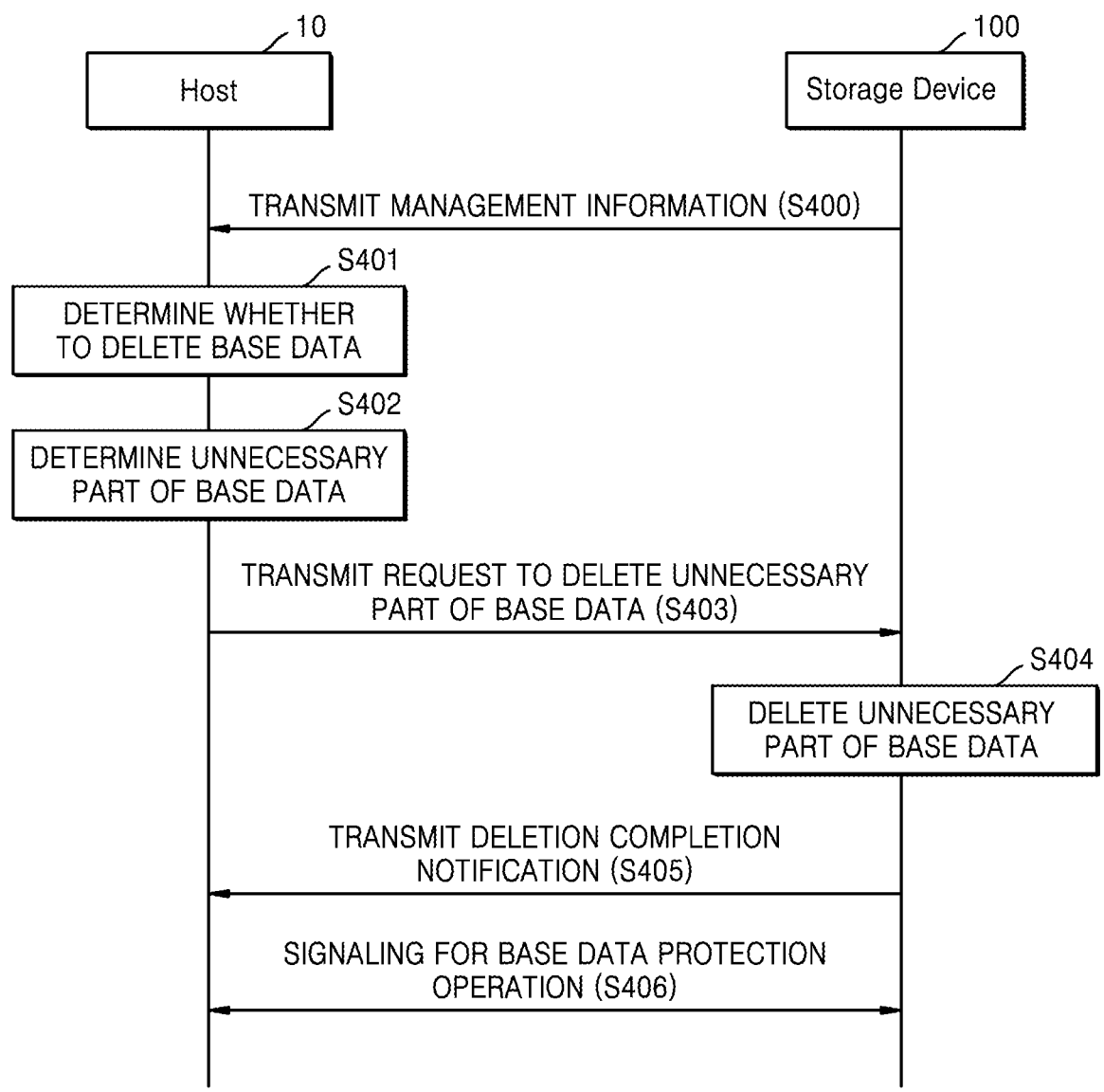

FIGS. 10A and 10B are flowcharts illustrating signaling for the base data protection operation against the rework between the host 10 and the storage device 100 according to an embodiment of the inventive concept. Hereinafter, it is premised that the size of the base data stored in the first memory region of the storage device 100 is greater than the free size of the second memory region.

Referring to FIG. 10A, in operation S300, the host 10 may transmit the first state change request from the soldered state S4 to the backup loading state S5 to the storage device 100. In operation S301, the state of the storage device 100 may fail to change from the soldered state S4 to the backup loading state S5 because the base data stored in the first memory region may not migrate to the second memory region. In operation S302, the storage device 100 may transmit a state change failure notification to the host 10 in response to the first state change request. In operation S303, the host 10 may determine the unnecessary part of the base data stored in the storage device 100. In operation S304, the host 10 may transmit a request to delete the unnecessary part of the base data to the storage device 100. In some embodiments, the host 10 may additionally transmit information, such as an address of the unnecessary part of the base data to the storage device 100. In operation S305, the storage device 100 may delete the unnecessary part of the base data in response to the request of operation S304. In operation S306, the storage device 100 may transmit a deletion completion notification to the host 10 in response to the request of operation S304. In operation S307, the host 10 may transmit the signaling for the base data protection operation together with the storage device 100.

Referring to FIG. 10B, in operation S400, the storage device 100 may transmit the management information 111_2 to the host 10. In operation S401, the host 10 may determine whether to delete the base data, based on the second information and the third information of the management information 111_2. In operation S402, the host 10 may determine the unnecessary part of the base data. In operation S403, the host 10 may transmit a request to delete the unnecessary part of the base data to the storage device 100. In operation S404, the storage device 100 may delete the unnecessary part of the base data in response to the request of the operation S403. In operation S405, the storage device 100 may transmit a deletion completion notification to the host 10 in response to the request of the operation S403. In operation S406, the host 10 may transmit the signaling for the base data protection operation together with the storage device 100.

In the embodiment of FIG. 10A, the unnecessary part of the base data may be determined after receiving the state change failure notification from the storage device 100. In the embodiment of FIG. 10B, it may be preemptively determined whether to delete the base data based on the management information 111_2 received from the storage device 100.

Because FIGS. 10A and 10B are only examples, embodiments of the inventive concept are not limited thereto. In some embodiments, the storage device 100 may determine the unnecessary part of the base data and may delete the unnecessary part of the base data in response to the request of the host 10 or may actively delete the unnecessary part of the base data during the base data protection operation without the request of the host 10.

Figure 11A:
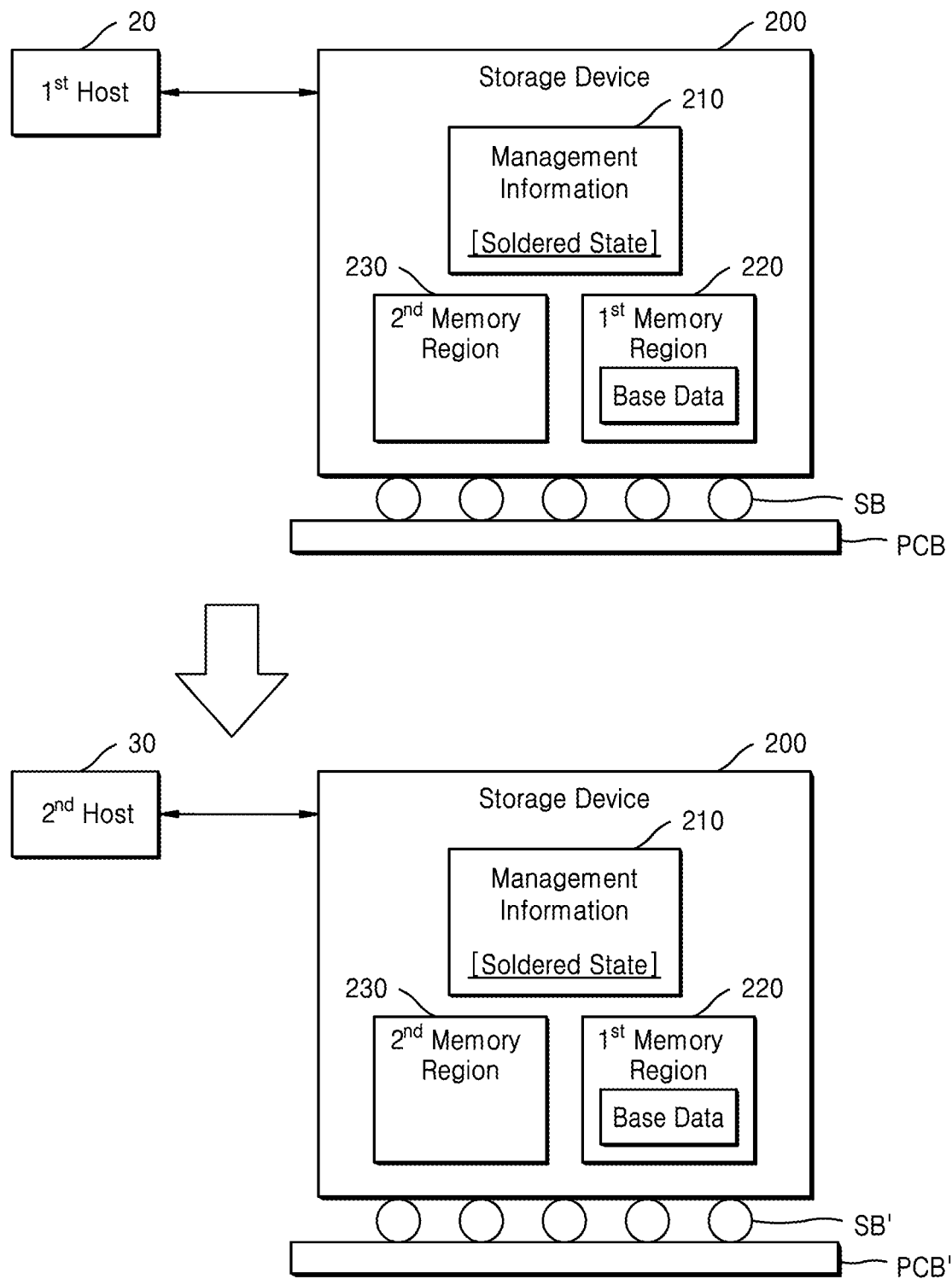

FIGS. 11A and 11B are views illustrating an operation of a storage device 200 according to an embodiment of the inventive concept.

Referring to FIG. 11A, the storage device 200 may include management information 210, a first memory region 220, and a second memory region 230. The storage device 200 may be connected to a first host 20 to undergo a first reflow process. Solder balls SB may be formed through the first reflow process so that the storage device 200 may be mounted on a printed circuit board (PCB). The storage device 200 may have current base data stored in the first memory region 220 and may update the management information 210 in a soldered state representing that the storage device 200 undergoes the first reflow process.

Then, the storage device 200 may be detached from the printed circuit board (PCB), which may be due to a variety of reasons, so that the solder balls SB may be removed and may be connected to the second host 30. Meanwhile, the storage device 200 may migrate basic data from the first memory area 220 to the second memory area 230 before being detached from the printed circuit board PCB. In this case, the storage device 200 may change the management information 210 in the order of the backup loading state and the backup complete state. Thereafter, the storage device 200 may be detached from the printed circuit board PCB through a reflow process, and the solder balls SB may be removed. The storage device 200 may be attached to other printed circuit board PCB' through other solder balls SB' by rework. Thereafter, the storage device 200 may return the basic data of the second memory area 230 to the first memory area 220 and change the management information 210 to the soldered state. The second host 30 may request the management information 210 from the storage device 200 to determine that the storage device 200 is currently in the soldered state and may determine that the base data is stored in the first memory region 220 and the storage device 200 undergoes the first reflow process. The second host 30 may control a base data protection operation against a rework for the storage device 200 based on a state of the storage device 200.

Referring to FIG. 11B, the storage device 200 may be connected to the first host 20 to prepare the first reflow process. The storage device 200 may set the management information 210 in an off state representing that the base data protection operation against the first reflow process is deactivated.

Then, the storage device 200 may be connected to the second host 30, which may be due to a variety of reasons. The second host 30 may request the management information 210 from the storage device 200 to determine that the storage device 200 is currently in the off state and may determine that the first reflow process is not performed on the storage device 200. The second host 30 may control the base data protection operation against the first reflow process for the storage device 200 based on the state of the storage device 200. In some embodiments, the second host 30 may transmit a request to write the base data and the base data to the storage device 200 and the storage device 200 may write the base data in the method described with reference to FIGS. 4A and 4B.

Figure 12A:
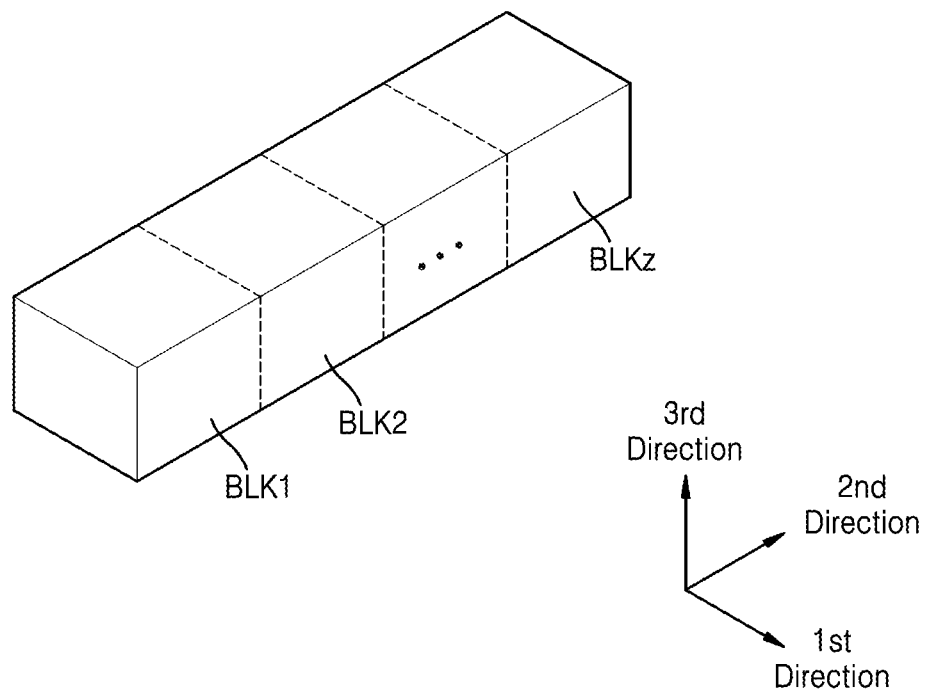
FIG. 12A is a block diagram illustrating a memory cell array of the non-volatile memory device of FIG. 1 according to an embodiment of the inventive concept.
Figure 12B:
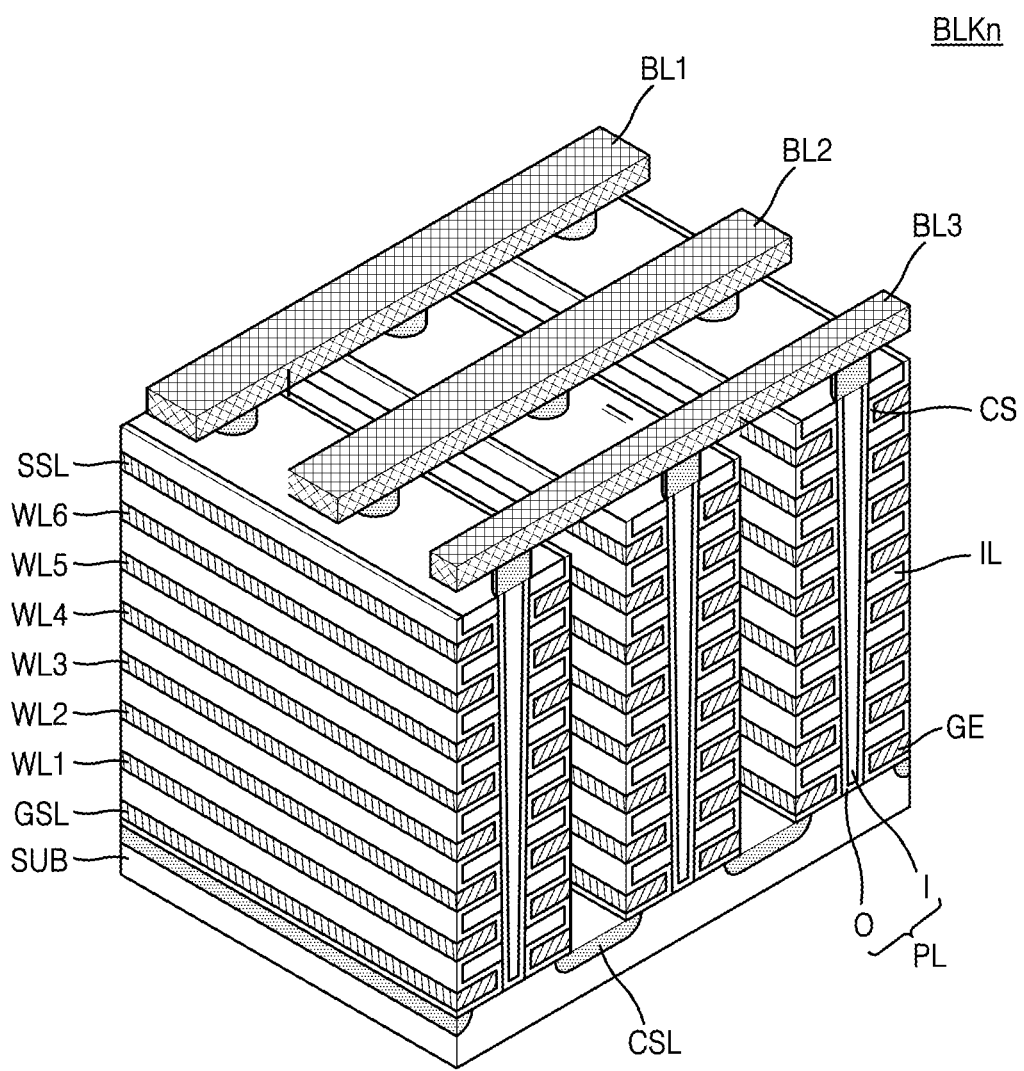
FIG. 12B is a view illustrating a configuration of one of the memory blocks of FIG. 12A according to an embodiment of the inventive concept.

FIG. 12A is a block diagram illustrating a memory cell array MCA of the non-volatile memory device 120 of FIG. 1 according to some embodiments of the inventive concept, and FIG. 12B is a view illustrating a configuration of one BLKn of the memory blocks of FIG. 12A according to some embodiments of the inventive concept.

The memory cell array MCA may include a plurality of memory blocks BLK1 to BLKz. Each of the plurality of memory blocks BLK1 to BLKz may have a three-dimensional structure (or a vertical structure). For example, each of the plurality of memory blocks BLK1 to BLKz may include structures extending in first to third directions. Each of the plurality of memory blocks BLK1 to BLKz may include a plurality of cell strings (not shown) extending in the second direction. A plurality of cell strings (not shown) may be apart from one another in the first and third directions. The plurality of cell strings (not shown) of one memory block may be connected to, for example, a plurality of bit lines BL, a plurality of string selection lines SSL, a plurality of word lines WL, one ground selection line or a plurality of ground selection lines GSL, and a plurality of common source lines (not shown). The plurality of cell strings (not shown) of each of the plurality of memory blocks BLK1 to BLKz may share the plurality of bit lines BL. For example, the plurality of bit lines BL may extend in the second direction and may be shared by the plurality of memory blocks BLK1 to BLKz.

The first memory region 121 (refer to FIG. 1) and the second memory region 122 (refer to FIG. 1), according to an embodiment of the inventive concept, may be in units of memory blocks and may be distinguished by the controller 110 (refer to FIG. 1) to be controlled.

Referring to FIG. 12B, the one BLKn of the plurality of memory blocks BLK1 to BLKz of FIG. 12A is formed in a direction perpendicular to a substrate SUB. A plurality of common source lines CSL are arranged on the substrate SUB, and a plurality of gate electrodes GE and a plurality of insulation layers IL are alternately stacked on the substrate SUB. In addition, a plurality of charge storage layers CS may be formed between the plurality of gate electrodes GE and the plurality of insulation layers IL.

When the plurality of gate electrodes GE and the plurality of insulation layers IL that are alternately stacked are vertically patterned, a plurality of V-shaped pillars PL are formed. The plurality of V-shaped pillars PL are connected to the substrate SUB through the plurality of gate electrodes GE and the plurality of insulation layers IL. Outlines O of the plurality of V-shaped pillars PL include a semiconductor material to function as channels and insides I thereof may include an insulating material, such as silicon oxide.

The plurality of gate electrodes GE of the memory block BLKn may be respectively connected to the plurality of ground selection lines GSL, the plurality of word lines WL1 to WL6, and the plurality of string selection lines SSL. The plurality of pillars PL of the memory block BLKn may be respectively connected to the plurality of bit lines BL1 to BL3.

However, because the memory block BLKn illustrated in FIG. 12B is only an example for convenience of illustration, embodiments of the inventive concept are not limited thereto and may also be applied to one or more of the various embodiments of the memory block BLKn.

Figure 13:
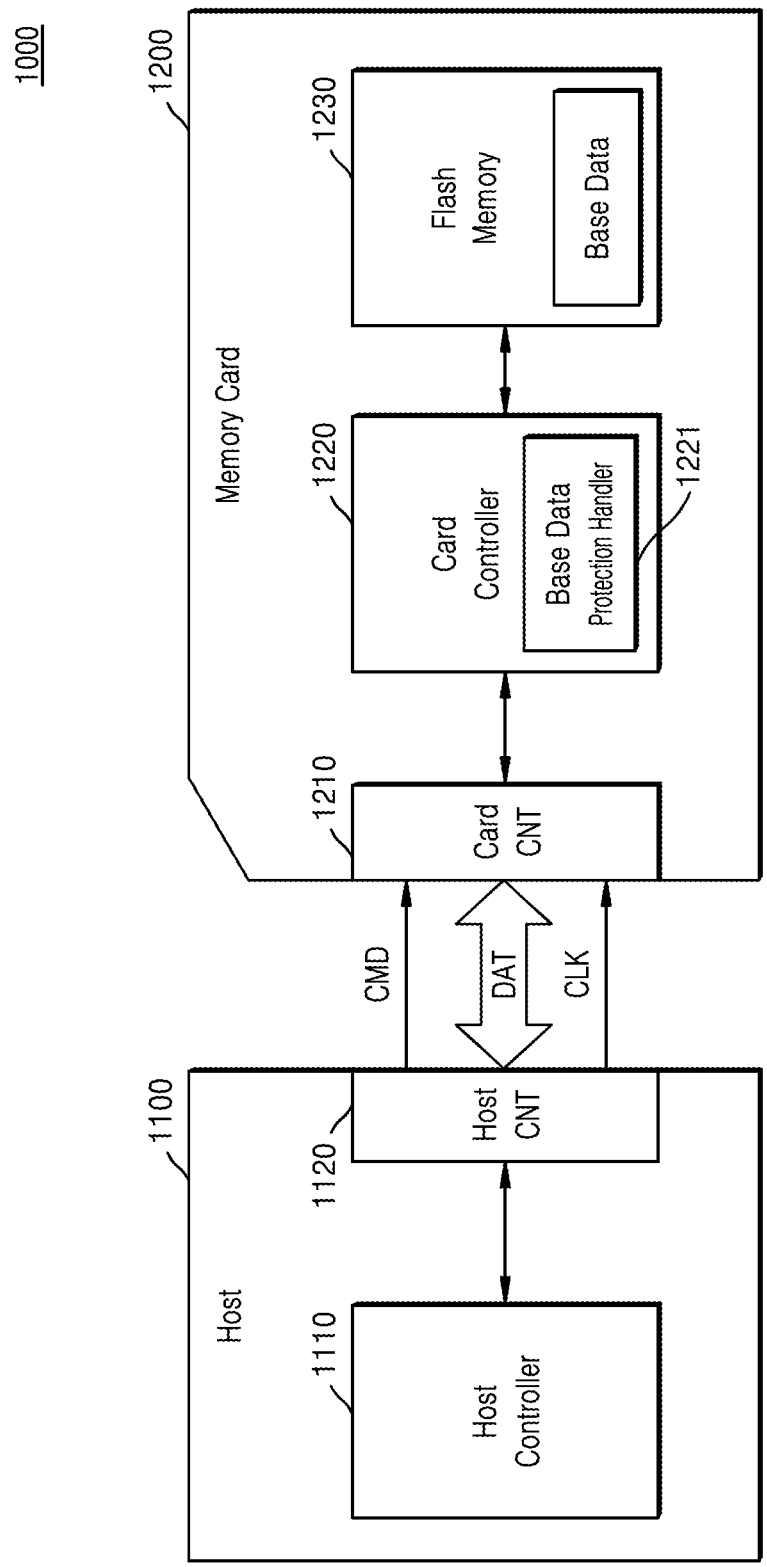
FIG. 13 is a block diagram schematically illustrating a card system according to an embodiment of the inventive concept.

FIG. 13 is a block diagram schematically illustrating a card system 1000 according to an embodiment of the inventive concept.

Referring to FIG. 13, the card system 1000 may include a host 1100 and a memory card 1200. The host 1100 may include a host controller 1110 and a host connection unit 1120. The memory card 1200 may include a card connection unit 1210, a card controller 1220, and flash memory 1230.

The host connection unit 1120 and the card connection unit 1210 may include a plurality of pins. The plurality of pins may include command pins, data pins, clock pins, and power pins. The number of pins may vary depending on a type of the memory card 1200. The host 1100 may be configured to write data in the memory card 1200 or may read data stored in the memory card 1200. The host controller 1110 may be configured to transmit a request (for example, a write request), a clock signal CLK generated by a clock generator (not shown) in the host 1100, and data DAT to the memory card 1200 through the host connection unit 1120. The card controller 1220 may be configured to store the data DAT in the flash memory 1230 in synchronization with the clock signal generated by the clock generator (not shown) in the card controller 1220 in response to the write request received through the card connection unit 1210. The flash memory 1230 may be configured to store the data DAT transmitted by the host 1100. For example, when the host 1100 is a digital camera, image data may be stored.

The memory card 1200 according to an embodiment of the inventive concept may include an embedded multimedia card (eMMC). The card controller 1220 may include a base data protection handler 1221, according to an embodiment of the inventive concept, and may be configured to perform a base data protection operation against a rework through the base data protection handler 1221. In addition, in an operation in which the memory card 1200 is mounted in an electronic device (not shown), management information on a current state of the memory card 1200 may be provided to a host (not shown) connected to the memory card 1200. The base data protected by the base data protection handler 1221 may be stored in the flash memory 1230 and may be read from the card controller 1220 to be executed for an operation of the memory card 1200.

The card connection unit 1210 may be configured to communicate with the outside (for example, external devices and/or the host) through one or more of a variety of different interface protocols, such as a universal serial bus (UBS) protocol, a multimedia card (MMC) protocol, a peripheral component interconnect-express (PCI-E) protocol, a statistical analysis system (SAS) protocol, a serial advanced technology attachment (SATA) protocol, a parallel ATA (PATA) protocol, a small computer system interface (SCSI) protocol, an enhanced small device interface (ESDI) protocol, and an integrated development environment (IDE) protocol.

Figure 14:
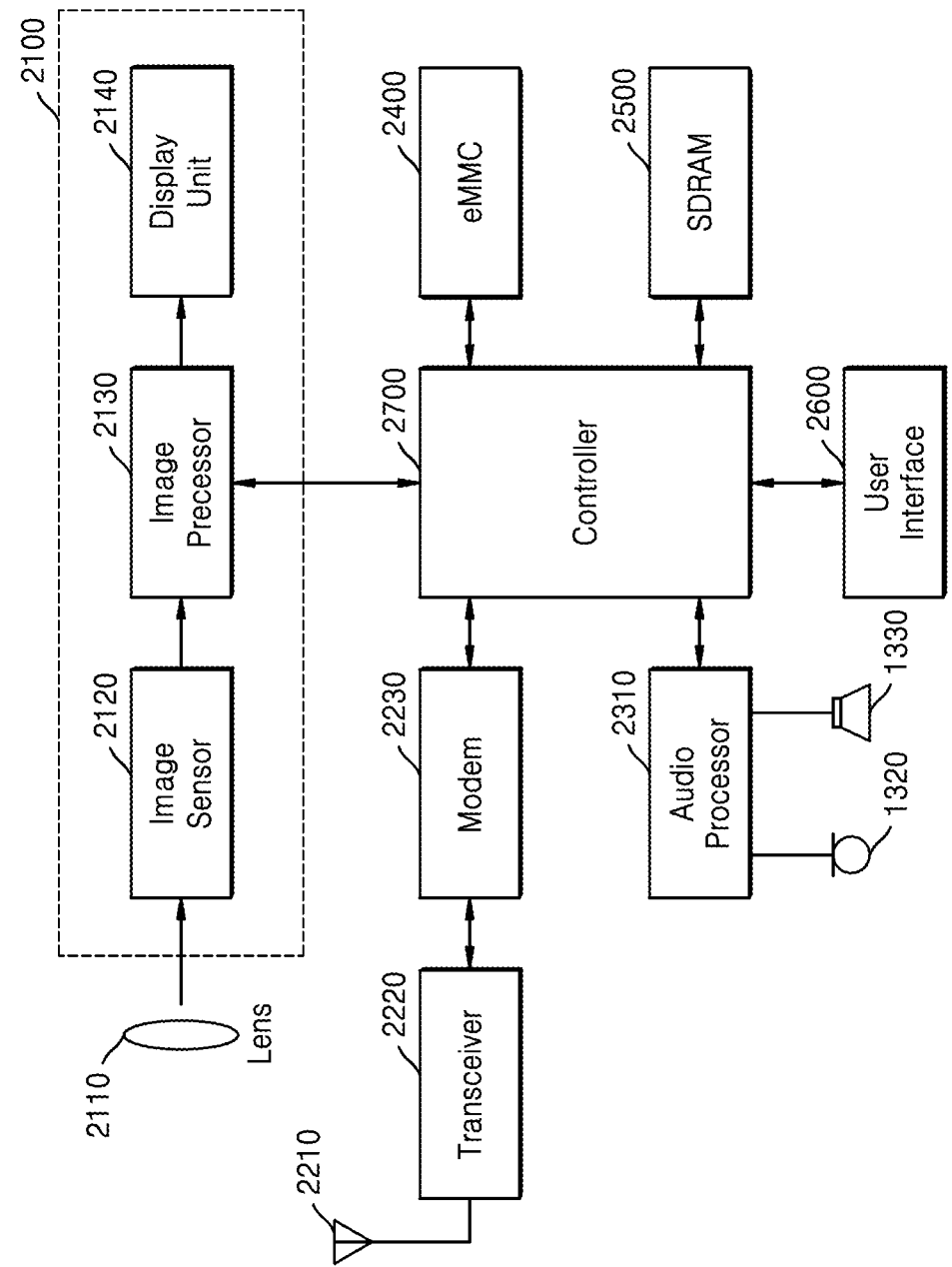
FIG. 14 is a block diagram illustrating a portable terminal according to an embodiment of the inventive concept.

FIG. 14 is a block diagram illustrating a portable terminal 2000 according to an embodiment of the inventive concept.

Referring to FIG. 14, the portable terminal 2000 may include an image processing unit 2100, an audio transceiver 2200, an audio processing unit 2300, an eMMC 2400, static dynamic random access memory (SDRAM) 2500, a user interface 2600, and a controller 2700.

The image processing unit 2100 may include a lens 2110, an image sensor 2120, an image processor 2130, and a display unit 2140. The audio transceiver 2200 may include an antenna 2210, a transceiver 2220, and a modem 2230. The audio processing unit 2300 may include an audio processor 2310, a microphone 2320, and a speaker 2330.

Here, the base data including an operating system image or debugging data may be stored in the eMMC 2400. In particular, to protect the base data against heat generated by a process of mounting the eMMC 2400 in the portable terminal 2000, the eMMC 2400 may perform the base data protection operation according to an embodiment of the inventive concept. Therefore, the eMMC 2400 according to embodiments of the inventive concept may correctly perform an operation required by the controller 2700 based on the base data with high reliability.

The memory card, the non-volatile memory device, and the card controller according to an embodiment of the inventive concept may be mounted by using a package of one of various forms. For example, the flash memory and/or the memory controller according to the inventive concept may be mounted by using a package, such as a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline integrated circuit (SOIC), a shrink small outline package (SSOP), a thin small outline (TSOP), a system in package (SIP), a multichip package (MCP), a wafer-level fabricated package (WFP), or a wafer-level processed stack package (WSP).

While the inventive concept has been particularly shown and described with reference to embodiments thereof, it will be understood that various changes in form and details may be made therein without departing from the spirit and scope of the following claims.

What is claimed is:

1. A storage device comprising:
a non-volatile memory device including a first memory region and a second memory region, memory cells of the first memory region being at different levels from memory cells of the second memory region; and
a controller configured to control a base data protection operation against a rework for a reflow process by including a first operation of migrating base data stored in the first memory region to the second memory region before the rework for the reflow process and a second operation of restoring the base data from the second memory region to the first memory region after completing the rework for the reflow process,
wherein the controller is configured to provide, to a host, management information including one or more of first information on a current state in a base data protection operation against the rework for the reflow process, second information on the first memory region, and third information on the second memory region.

2. The storage device of claim 1, wherein the first memory region comprises multilevel cells, and
wherein the second memory region comprises single-level cells.

3. The storage device of claim 1, wherein the first information represents one of a soldered state representing that the base data is stored in the first memory region, a backup loading state representing that the first operation is being performed, and a backup complete state representing that the first operation is completed.

4. The storage device of claim 3, wherein, when the storage device is in the soldered state, the controller is configured to change a state of the storage device from the soldered state to the backup loading state in response to a request from the host to change the state of the storage device to the backup loading state.

5. The storage device of claim 3, wherein, when the storage device is in the backup complete state, the controller is configured to change a state of the storage device from the backup complete state to the soldered state in response to a request from the host to change the state of the storage device to the soldered state.

6. The storage device of claim 1, wherein the base data comprises one or more of an operating system image for the storage device and debugging data for the storage device.

7. The storage device of claim 1, wherein the controller is further configured to control the base data protection operation against the reflow process by including a third operation of migrating the base data stored in the first memory region to the second memory region before the reflow process and a fourth operation of restoring the base data from the second memory region to the first memory region after completing the reflow process.

8. The storage device of claim 7, wherein the management information further comprises fourth information on one of an off state representing that a base data protection operation against the reflow process is deactivated, a pre-soldering state representing that the third operation is being performed, a loading complete state representing that the third operation is completed, and a soldered state representing that the base data is stored in the first memory region by the fourth operation.

9. The storage device of claim 8, wherein the controller is configured to prevent a change from the soldered state to the off state from occurring.

10. The storage device of claim 1, wherein the second information represents a size of the base data stored in the first memory region, and
wherein the third information represents a free size of the second memory region.

11. The storage device of claim 1, wherein the host is a first host and the storage device is connected to a second host, host different from the first host, before the rework for the reflow process, and
wherein the controller is configured to provide the management information to the second host.

12. A method of operating a storage device for protecting base data received from a host in a rework for a reflow process, the method comprising:
setting the storage device in a soldered state representing that the base data is stored in a first memory region after completing the reflow process for the storage device;
changing a state of the storage device from the soldered state to a backup loading state for a first operation of migrating the base data from the first memory region to a second memory region with higher reliability in response to a first state change request received from the host;
changing a state of the storage device from the backup loading state to a backup complete state when the first operation is completed; and
changing a state of the storage device from the backup complete state to the soldered state for a second operation of restoring the base data from the second memory region to the first memory region in response to a second state change request received from the host.

13. The method of claim 12, wherein, when the storage device is in the backup complete state, the rework for the reflow process is performed.

14. The method of claim 13, wherein the rework for the reflow process comprises an operation of exchanging a plurality of first solder balls formed in the storage device by the reflow process with a plurality of second solder balls.

15. The method of claim 13, wherein the rework for the reflow process comprises an operation of exchanging a plurality of first solder balls formed in a semiconductor device arranged to be adjacent to the storage device by the reflow process with a plurality of second solder balls.

16. The method of claim 12, further comprising:
updating first information on a current state of the storage device to one of the soldered state, the backup loading state, and the backup complete state; and
storing second information on a size of the base data stored in the first memory region and third information on a free size of the second memory region.

17. The method of claim 16, further comprising:
providing one or more of the first information, the second information, and the third information to the host in response to a request from the host.

18. The method of claim 17, further comprising:
receiving a request to delete a part of the base data from the host when it is determined that the size of the base data is greater than the free size of the second memory region through the second information and the third information; and
deleting a part of the base data stored in the first memory region in response to the request to delete the part of the base data.

19. The method of claim 12, further comprising:
changing a state of the storage device from the backup loading state or the backup complete state to the soldered state in response to a request from the host to cancel a base data protection operation.

* * * * *